(12) United States Patent
Rofougaran

(10) Patent No.: US 7,787,547 B2
(45) Date of Patent: Aug. 31, 2010

(54) HYBRID RADIO FREQUENCY TRANSMITTER

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1019 days.

(21) Appl. No.: 11/388,822

(22) Filed: Mar. 24, 2006

(65) Prior Publication Data

US 2007/0223623 A1    Sep. 27, 2007

(51) Int. Cl.
*H04K 1/10* (2006.01)
(52) U.S. Cl. ...................................... 375/260
(58) Field of Classification Search ................ 375/260, 375/261, 262, 295, 296, 297, 298, 300
See application file for complete search history.

(56) References Cited

U.S. PATENT DOCUMENTS

| | | | | |
|---|---|---|---|---|
| 5,134,404 A * | 7/1992 | Peterson | .................... | 341/116 |
| 6,148,216 A * | 11/2000 | Osaki | ....................... | 455/561 |
| 6,266,517 B1 * | 7/2001 | Fitzpatrick et al. | ........ | 455/114.3 |
| 6,940,893 B1 * | 9/2005 | Pinkney et al. | ............ | 375/139 |
| 6,998,909 B1 * | 2/2006 | Mauer | ........................ | 330/2 |
| 7,010,280 B1 * | 3/2006 | Wilson | ...................... | 455/126 |
| 7,072,421 B2 * | 7/2006 | Bengtsson et al. | ......... | 375/298 |
| 7,079,550 B2 * | 7/2006 | Padovani et al. | ............ | 370/468 |
| 7,330,501 B2 * | 2/2008 | Trachewsky et al. | ........ | 375/219 |
| 7,453,948 B2 * | 11/2008 | Kim et al. | ................... | 375/267 |
| 7,460,607 B2 * | 12/2008 | van Rooyen et al. | ........ | 375/265 |
| 2004/0219891 A1 * | 11/2004 | Hadjichristos | ............. | 455/102 |
| 2004/0233599 A1 * | 11/2004 | Busking | ..................... | 361/85 |
| 2005/0152469 A1 * | 7/2005 | Fusco et al. | ................. | 375/295 |
| 2005/0152471 A1 * | 7/2005 | Tanaka et al. | ............... | 375/295 |
| 2005/0157778 A1 * | 7/2005 | Trachewsky et al. | ........ | 375/219 |
| 2006/0038710 A1 | 2/2006 | Staszewski et al. | | |
| 2007/0165743 A1 * | 7/2007 | McCallister | ................ | 375/296 |

* cited by examiner

*Primary Examiner*—Chieh M Fan
*Assistant Examiner*—Jaison Joseph
(74) *Attorney, Agent, or Firm*—Garlick Harrison & Markison; Timothy W. Markison; Holly L. Rudnick

(57) ABSTRACT

A hybrid transmitter includes first and second up-conversion modules, a combining module, and a power amplifier circuit. The first up-conversion module is operably coupled to generate a first up-conversion signal based on a normalized in-phase (I) symbol, an in-phase local oscillation, and phase or frequency information. The second up-conversion module is operably coupled to generate a second up-conversion signal based on a normalized quadrature (Q) symbol, a quadrature local oscillation, and the phase or frequency information. The combining module is operably coupled to combine the first and second up-conversion signals to produce a radio frequency (RF) signal. The power amplifier circuit is operably coupled to adjust amplitude of the RF signal based on amplitude information to produce an amplitude and phase modulated RF signal.

11 Claims, 16 Drawing Sheets

US 7,787,547 B2

HYBRID RADIO FREQUENCY TRANSMITTER

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication systems and more particularly to radio frequency transmitters used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Currently, there are two basic types of RF transmitters: Cartesian based transmitter and a Polar coordinate based transmitter. A Cartesian based transmitter includes baseband processing and RF transmission circuitry. The baseband processing encodes, punctures, maps, interleaves, and domain converts outbound data into an in-phase (I) signal component and a quadrature (Q) signal component. For example, if the baseband processing utilizes a 64 quadrature amplitude modulation (QAM) scheme, an a first outbound data value of 101 may be ½ rate encoded into a value of 11 11 01 and a second outbound data value of 011 may be ½ rate encoded into a value of 00 11 01. After puncturing, the encoded values may be interleaved to produce a first interleaved value of 10 11 01 and a second interleaved value of 01 10 01. The first interleaved value is mapped into an I value of 101 and a Q value of 101 and the second interleaved value is mapped into an I value of 011 and a Q value of 001. Each pair of mapped I and Q interleaved values are converted into time domain signals via an inverse fast Fourier transform (IFFT) for a corresponding sub carrier of the signaling protocol (e.g., orthogonal frequency division multiplexing [OFDM]). The time domain I and Q signals are converted into analog signals via an analog to digital converter to produce the I signal component and the Q signal component.

The RF transmission circuitry includes a local oscillator, a mixing section, a linear power amplifier, and may include RF filtering. For direct conversion transmitters, the local oscillator generates an I local oscillation and a Q local oscillation, which are respectively mixed with the I signal component and the Q signal component via the mixing section. The resulting I mixed signal and Q mixed signal are summed to produce an RF signal. The linear power amplifier amplifies to the RF signal to produce an amplified RF signal that may be subsequently bandpass filtered prior to transmission.

While a Cartesian based RF transmitter provides the advantage of a single side band transmitter (i.e., do not have a negative frequencies with I and Q signals), the transmitter path (i.e., the mixing section and the power amplifier) needs to be linear to avoid loss of data resolution. In particular, the linearity requirement limits the output power of the power amplifier.

A Polar coordinate based transmitter includes baseband processing and RF transmission circuitry. The baseband processing encodes, punctures, maps, interleaves, and domain converts outbound data into polar coordinates of an amplitude (A) and a phase (Φ). For example, if the baseband processing utilizes a 64 quadrature amplitude modulation (QAM) scheme, an a first outbound data value of 101 may be 1/2 rate encoded into a value of 11 11 01 and a second outbound data value of 011 may be ½ rate encoded into a value of 00 11 01. After puncturing, the encoded values may be interleaved to produce a first interleaved value of 10 11 01 and a second interleaved value of 01 10 01. The first interleaved value is mapped into an amplitude value of $A_0$ and a phase value of $\Phi_0$ and the second interleaved value is mapped into an amplitude value of $A_1$ and a phase value of $\Phi_1$.

The RF transmission circuitry includes a local oscillator and a power amplifier. The local oscillator includes a phase locked loop (PLL) that generates a local oscillation at a desired RF frequency that is modulated based on phase values $\Phi_0$ and $\Phi_1$. The phase modulated RF signal is then amplitude modulated by the power amplifier in accordance with the amplitude values $A_0$ and $A_1$ to produce a phase and amplitude modulated RF signal.

While the Polar coordinate RF transmitter provides the advantages of reduced RF filtering due to the response of the PLL and the use of a non-linear power amplifier (which, for the same die area, is capable of greater output power than a linear power amplifier), there are some disadvantages. For instance, the response of the PLL is narrow, thus limiting the RF transmitter to narrow band uses. Further, maintaining synchronization between the phase values and the amplitude values can be difficult due to the delays within the PLL. Still further, the baseband processing is utilizing real signals, thus has to account for potential negative frequencies.

Therefore, a need exists for a transmitter that provides the advantages of a Cartesian RF transmitter and a Polar coordinate transmitter without some or all of the disadvantaged associated therewith.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
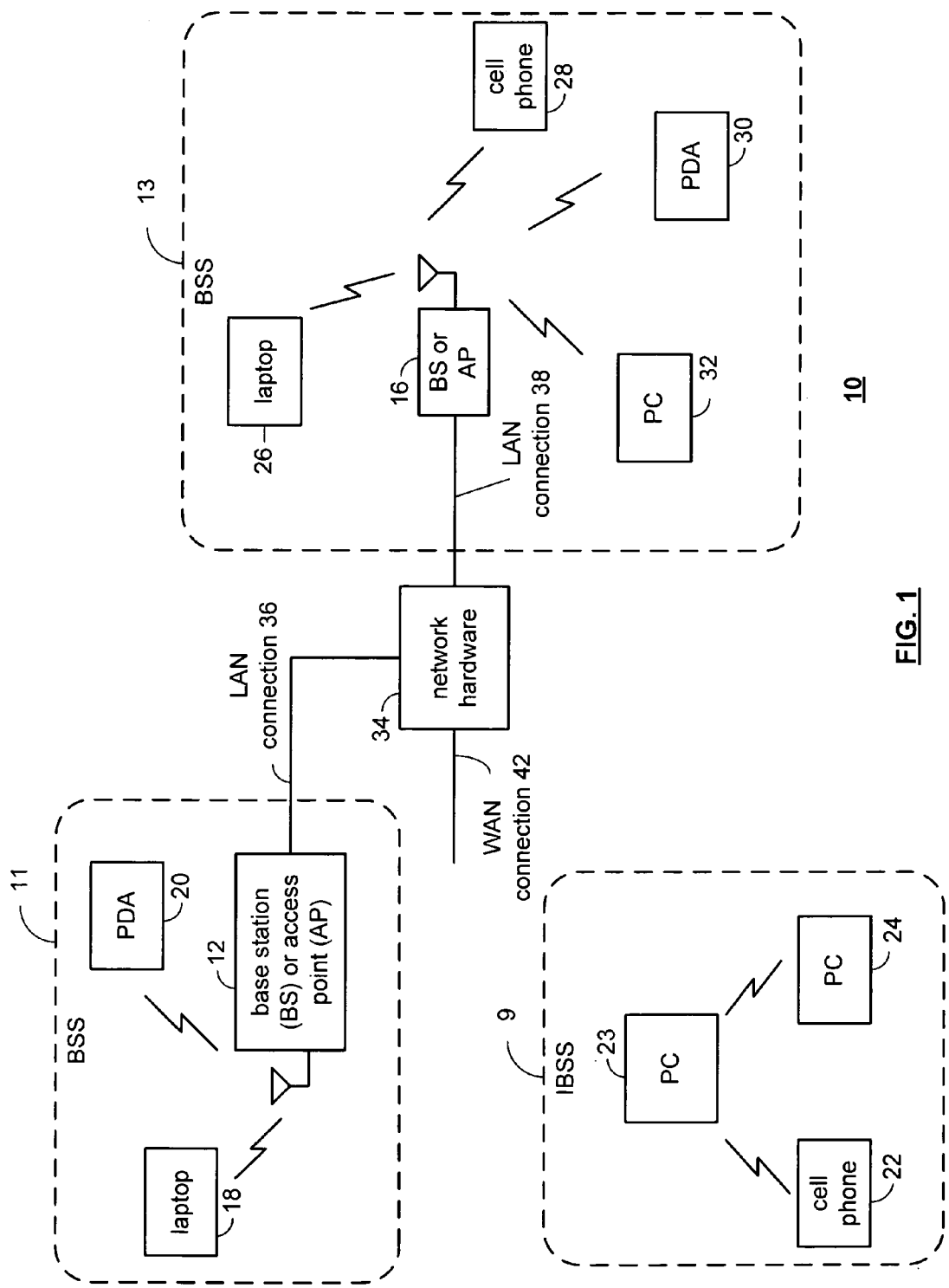
FIG. 1 is a schematic block diagram of a communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
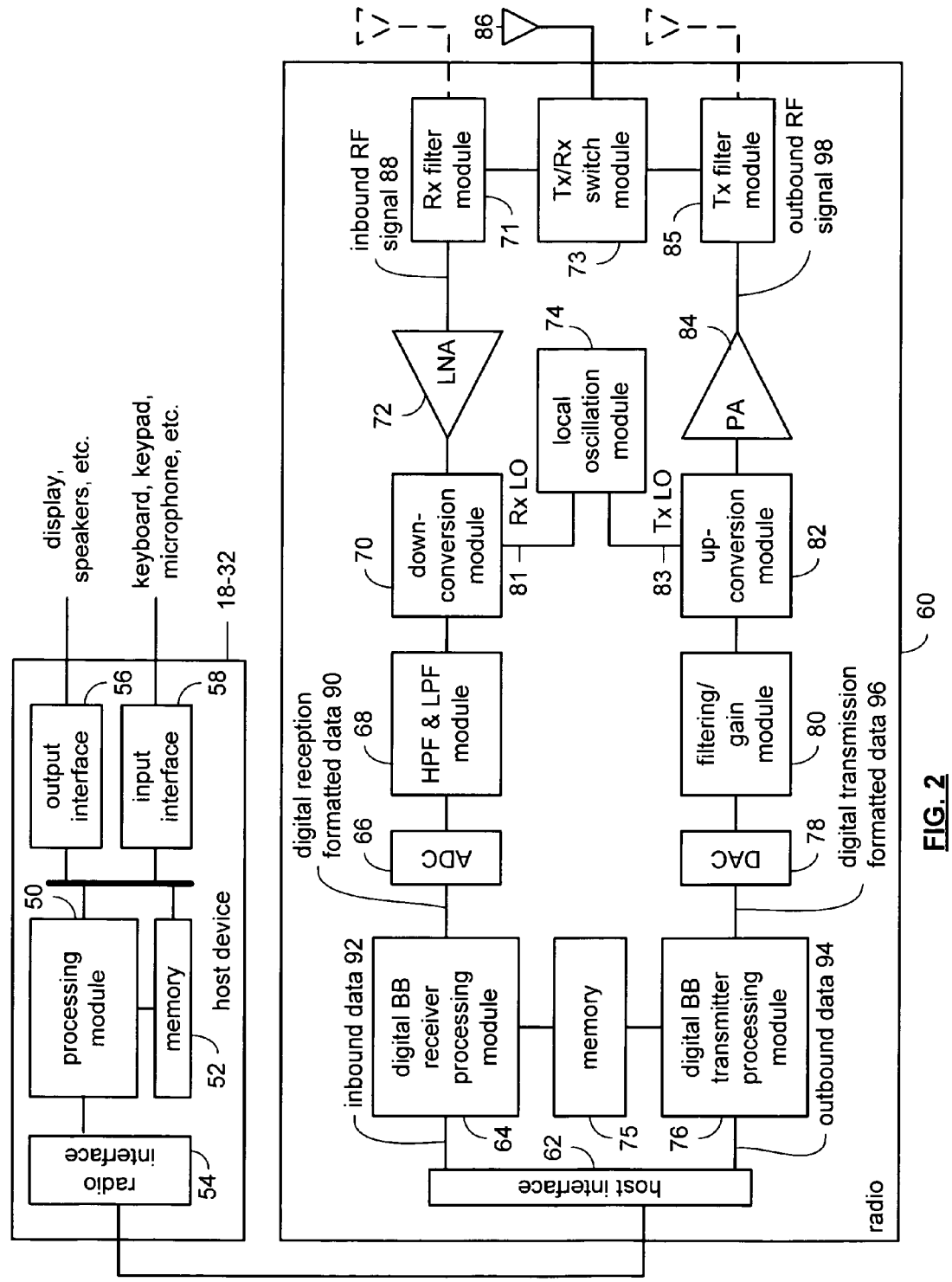
FIG. 2 is a schematic block diagram of an embodiment of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a local oscillation module 74, memory 75, a receiver path, a transmitter path, and a transmit/receive switch module 71, which is coupled to antenna 86. The receiver path includes a receiver filter 71, a low noise amplifier 72, a down conversion module 70, a high pass and/or low pass filter module 68, an analog-to-digital converter 66, and a digital receiver processing module 64. The transmit path includes a digital transmitter processing module 76, a digital-to-analog converter 78, a filtering/gain module 80, an up conversion module 82, a power amplifier 84, and a transmitter filter module 85. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, demapping, depuncturing, decoding, and/or descrambling. The digital transmitter functions include, but are not limited to, scrambling, encoding, puncturing, mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, RFID, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the up-conversion mixing module 82. The up conversion mixing module 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device. The function of the transmit path will be described in greater detail with reference to FIGS. 4-17.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the down conversion mixing module 70, which converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64 decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
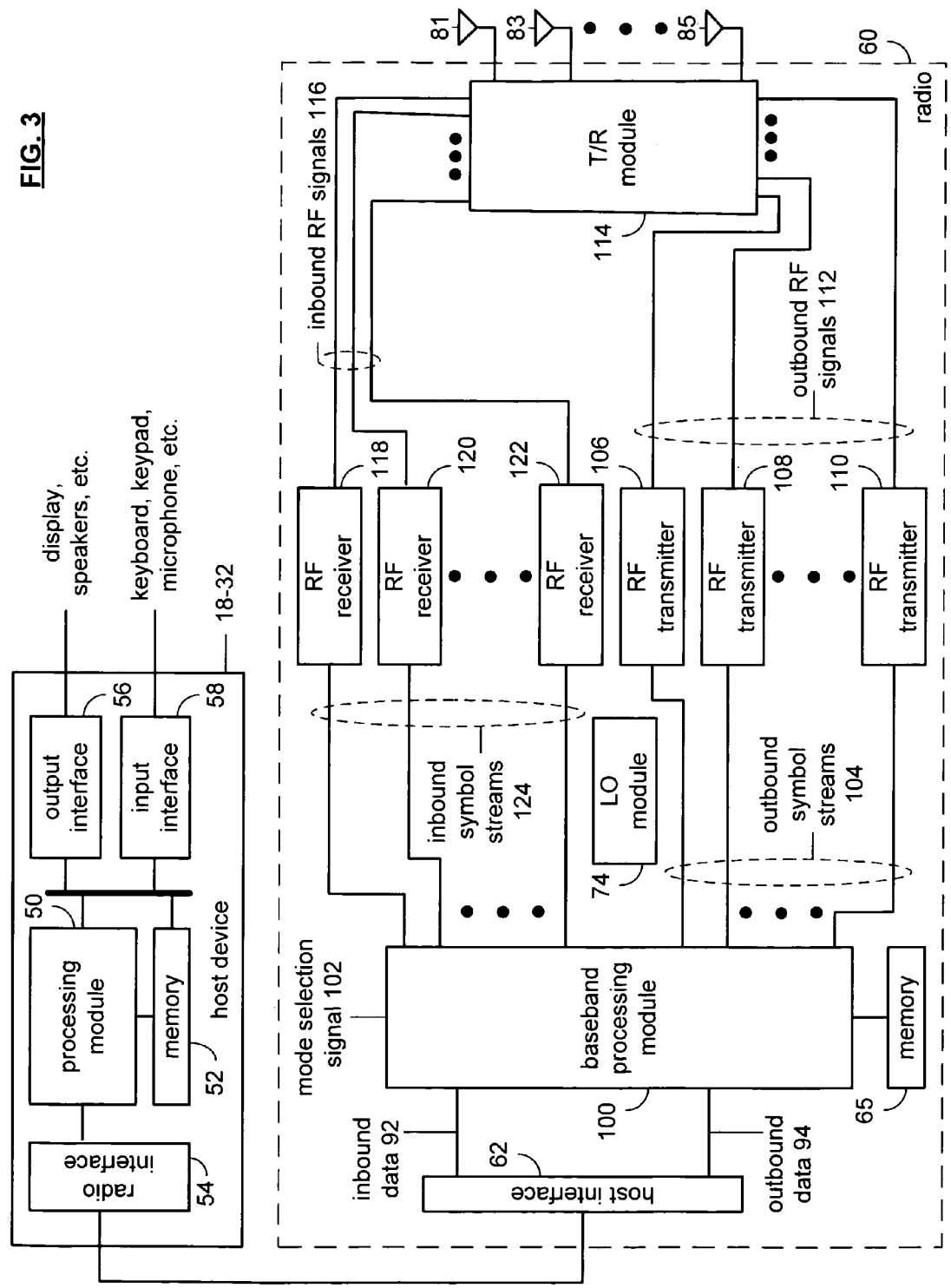
FIG. 3 is a schematic block diagram of another embodiment of a wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, memory 64, a receiver path, a transmit path, a local oscillation module 74, and a transmit/receive module 114, which is coupled to a plurality of antennas 81-85. The receive path includes a baseband processing module 100 and a plurality of RF receivers 118-120. The transmit path includes baseband processing module 100 and a plurality of radio frequency (RF) transmitters 106-110. The baseband processing module 100, in combination with operational instructions stored in memory 65 and/or internally operational instructions, executes digital receiver functions and digital transmitter functions, respectively. The digital receiver functions include, but are not limited to, digital intermediate frequency to baseband conversion, demodulation, constellation demapping, depuncturing, decoding, de-interleaving, fast Fourier transform, cyclic prefix removal, space and time decoding, and/or descrambling. The digital transmitter functions include, but are not limited to, scrambling, encoding, puncturing, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11, RFID, etc., standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. Each of the RF transmitters 106-110 may be implemented in accordance with the embodiments of FIGS. 4-17. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
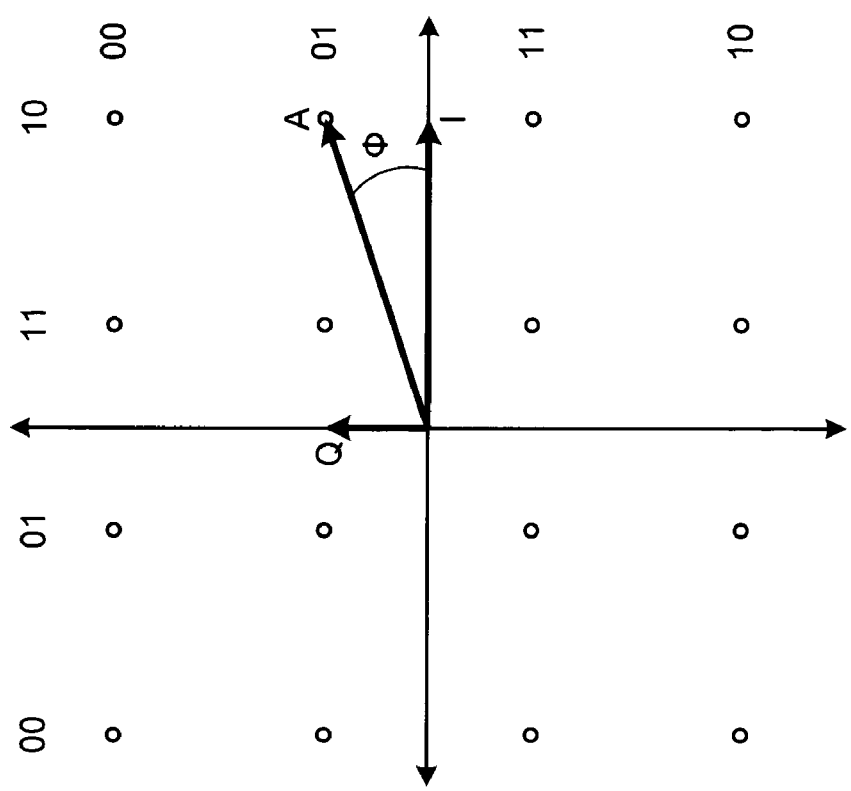
FIG. 4 is a diagram of an example of mapping an encoded value into Cartesian coordinates and into Polar coordinates.

FIG. 4 is a diagram of an example of mapping an encoded value into Cartesian coordinates and into Polar coordinates. In this example, the mapping corresponds to a 16 QAM scheme and the encode value is 10 01. For mapping into Cartesian coordinates, the encoded value is converted into an in-phase (I) component and a quadrature component (Q). For this example, the I component is 10 and the Q component is 01. When the I and Q components are converted into time domain signals, the I component may be expressed as $A_I \cos(\omega_{d0}t)$ and the Q component may be expressed as $A_Q \sin(\omega_{d0}t)$, where, for this example, $A_I$ is based on 10 and $A_Q$ is based on 01.

In the example of FIG. 4, the encoded value of 10 01 may be mapped into Polar coordinates as a vector of magnitude A and phase $\Phi$. In the time domain, the Polar coordinate representation of the encoded value may be expressed as $A \cos(\Phi)$. Note that the Polar coordinates may be directly determined from the encoded value or based on the I and Q components, where:

$$\text{Phase} = \tan^{-1}(Q/I)$$

$$\text{Amplitude} = \sqrt{I^2 + Q^2}$$

Figure 5:
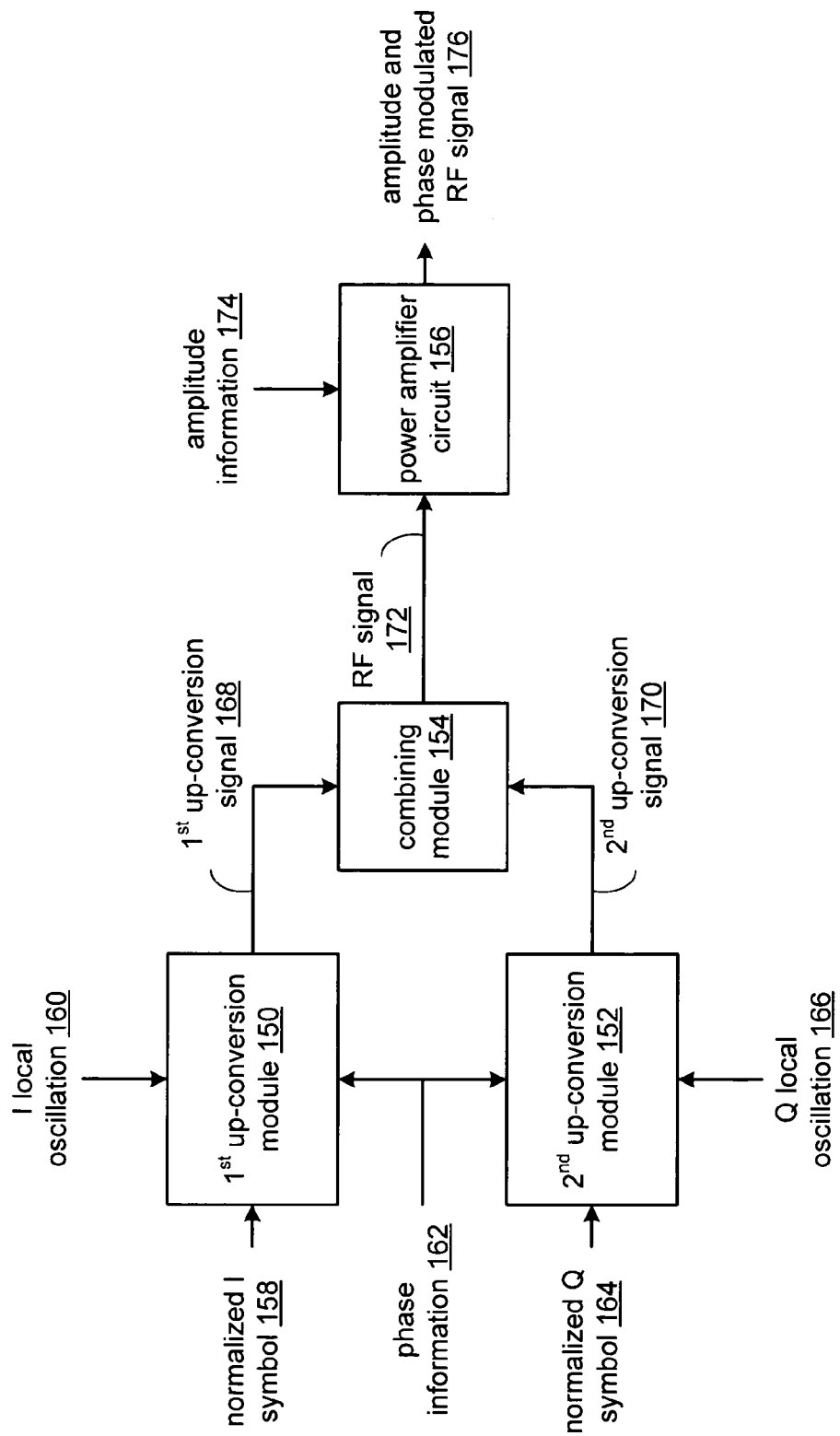
FIG. 5 is a schematic block diagram of an embodiment of a hybrid transmitter in accordance with the present invention.

FIG. 5 is a schematic block diagram of an embodiment of a hybrid transmitter that includes a $1^{st}$ up-conversion module 150, a $2^{nd}$ up-conversion module 152, a combining module 154, and a power amplifier circuit 156. The power amplifier circuit 156 may include one or more power amplifiers and/or one or more input power amplifier stages. When the power amplifier circuit 156 includes more than one power amplifier and/or input power amplifier stages, the power amplifiers and/or input power amplifier stages may be in series and/or in parallel.

The $1^{st}$ up-conversion module 150, embodiments of which will be discussed in greater detail with reference to FIGS. 6, 7, 11, and 12, generates a $1^{st}$ up-conversion signal 168 based on a normalized in-phase (I) symbol 158, an in-phase (I) local oscillation 160, and phase information 162. The $2^{nd}$ up-conversion module 152, embodiments of which will be discussed in greater detail with reference to FIGS. 6, 7, 11, and 12, generates a $2^{nd}$ up-conversion signal 170 based on a normalized quadrature symbol 164, a quadrature (Q) local oscillation 166, and phase information 162.

Figure 6:
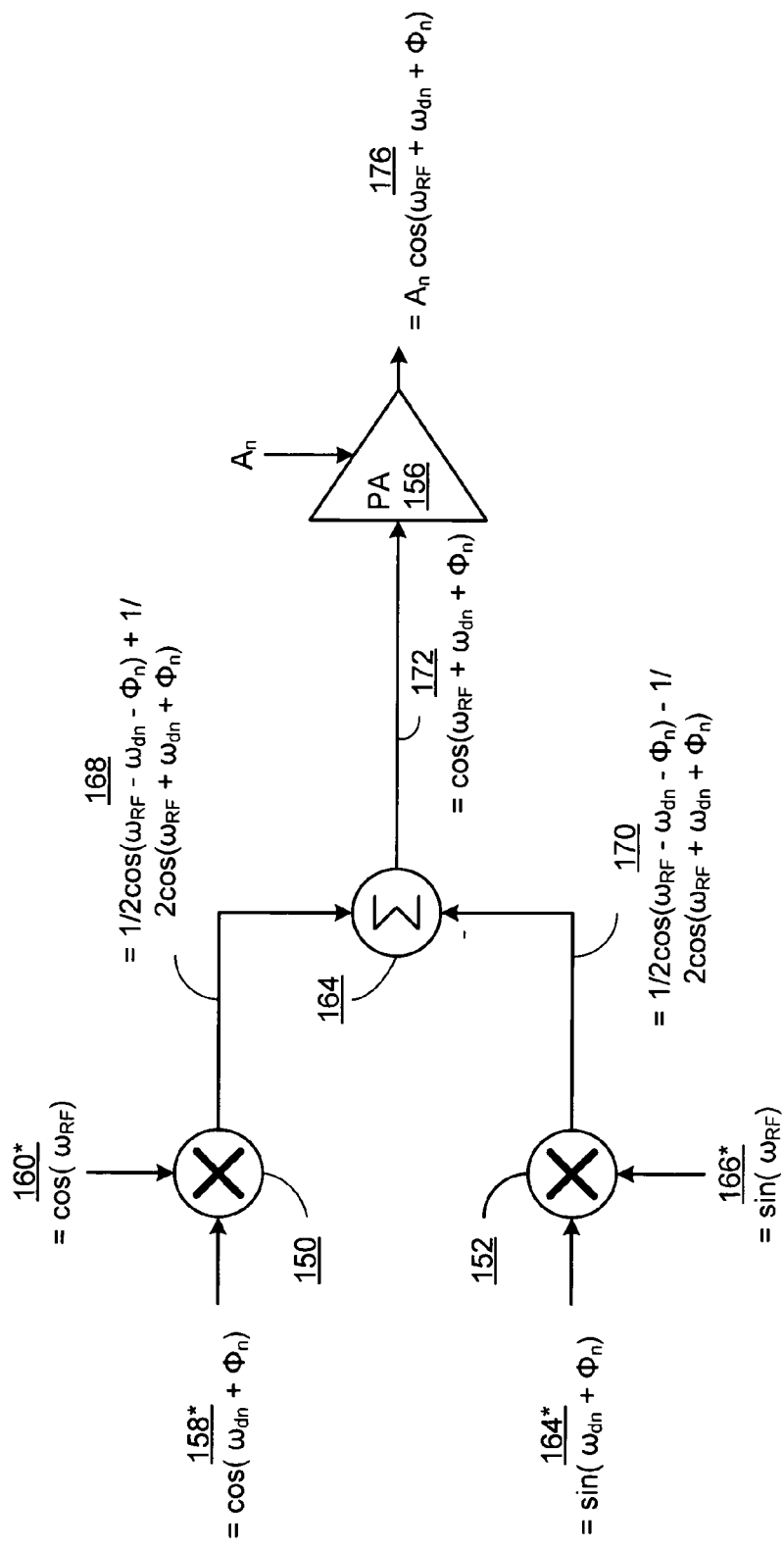
FIG. 6 is a functional diagram of an embodiment of a hybrid transmitter in accordance with the present invention.
Figure 7:
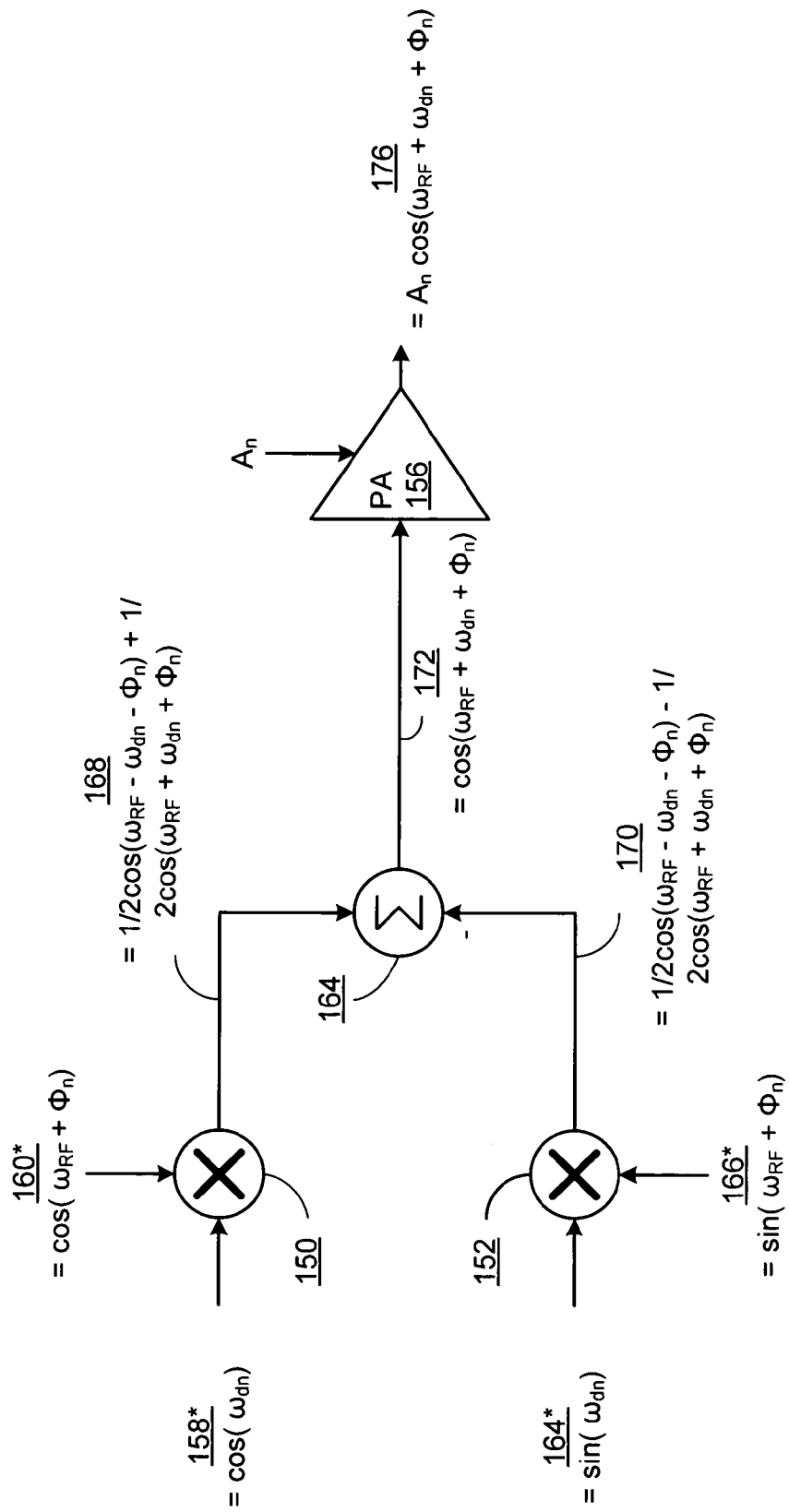
FIG. 7 is a functional diagram of another embodiment of a hybrid transmitter in accordance with the present invention.

The combining module 154, embodiments of which will be discussed in greater detail with reference to FIGS. 6, and 7, is operably coupled to combine the first and second up-conversion signals to produce a radio frequency (RF) signal 172. The power amplifier circuit 156 is operably coupled to adjust the amplitude of the RF signal 172 based on amplitude information 174 to produce an amplitude and phase modulated RF signal 176. Note that the hybrid transmitter of FIG. 5 may incorporate modules 76, 78, 80, 82, and 84 of FIG. 2 and/or modules 100 & 106, 108, and/or 110 of FIG. 3.

FIG. 6 is a functional diagram of an embodiment of a hybrid transmitter that includes a first mixer as at least part of the $1^{st}$ up-conversion module 150, a second mixer as at least part of the $2^{nd}$ up-conversion module 152, a subtraction module as the combining module 154, and the power amplifier circuit 156. In this embodiment, the normalized I symbol 158* is expressed as $\cos(\omega_{dn}+\Phi_n)$ and the normalized Q symbol 164* is expressed as $\sin(\omega_{dn}+\Phi_n)$, where $\omega_{dn}$ represents the frequency of the mapped and interleaved data and $\Phi_n$ represents the phase information 162. For example, $\omega_{dn}$ may correspond to the frequency of a subcarrier of an OFDM signal, where n represents the number of the subcarrier. Further, the OFDM signal may include a 20 MHz wide channel consisting of 64 subcarrier frequencies, where the subcarriers are frequency spaced by 312.5 KHz. Thus, for subcarrier number 10, $\omega_{d10}$ represents $2*\pi*10*312.5$ KHz.

As an example, the normalized I and Q symbols 158* and 164* may be generated from I and Q components. With reference to FIG. 4, the encoded value of 10 01 is mapped to an I value of 10 and a Q value of 01. For Cartesian coordinates, the time domain I signal component may be expressed as $A_I \cos(\omega_{dn})$ and the time domain Q component may be expressed as $A_Q \sin(\omega_{dn})$, where $A_I$ is based on 10 and $A_Q$ is based on 01. The magnitude of the time domain I and Q signal components may be normalized or adjusted to unity, or other desired value, to produce $\cos(\omega_{dn})$ and $\sin(\omega_{dn})$, respectively. The phase information ($\Phi_n$) may be generated from the magnitudes of the original I and Q signal components based on $\tan^{-1}(A_Q/A_I)$. The phase information is then used to adjust the unity amplitude I and Q signals to produce the normalized I and Q symbols 158* and 164* of FIG. 6.

The I local oscillation 160* is represented as $\cos(\omega_{RF})$ and the Q local oscillation 166* is represented as $\sin(\omega_{RF})$, where $\omega_{RF}$ represents the frequency of one or more local oscillation stages. For a direct conversion transmitter, $\omega_{RF}$ corresponds to the frequency of the RF signal 172. The first mixer mixes the normalized I symbol 158* with the I local oscillation 160* to produce the $1^{st}$ up-conversion signal 168, which may be expressed as $½ \cos(\omega_{RF}-\omega_{dn}-\Phi_n)+½ \cos(\omega_{RF}+\omega_{dn}+\Phi n)$. The second mixer mixes the normalized Q symbol 164* with the Q local oscillation 166* to produce the second up-conversion signal 170, which may be expressed as $½ \cos(\omega_{RF}-\omega_{dn}-\Phi_n)-½ \cos(\omega_{RF}+\omega_{dn}+\Phi_n)$.

When the first and second up-conversions signals 168 and 170 are combined, the resulting RF signal 172 may be expressed as $\cos(\omega_{RF}+\omega_{dn}+\Phi_n)$. The power amplifier circuit 156 adjusts the amplitude of the RF signal 172 based on the amplitude information ($A_n$) 174 to produce the amplitude and phase modulated RF signal 176, which may be expressed as $A_n \cos(\omega_{RF}+\omega_{dn}+\Phi_n)$.

FIG. 7 is a functional diagram of another embodiment of a hybrid transmitter that includes a first mixer as at least part of the 1$^{st}$ up-conversion module 150, a second mixer as at least part of the 2$^{nd}$ up-conversion module 152, a subtraction module as the combining module 154, and the power amplifier circuit 156. In this embodiment, the normalized I symbol 158* is expressed as $\cos(\omega_{dn})$ and the normalized Q symbol 164* is expressed as $\sin(\omega_{dn})$, where $\omega_{dn}$ represents the frequency of the mapped and interleaved data. As an example, the normalized I and Q symbols 158* and 164* may be generated from I and Q components. With reference to FIG. 4, the encoded value of 10 01 is mapped to an I value of 10 and a Q value of 01. For Cartesian coordinates, the time domain I signal component may be expressed as $A_I \cos(\omega_{dn})$ and the time domain Q component may be expressed as $A_Q \sin(\omega_{dn})$, where $A_I$ is based on 10 and $A_Q$ is based on 01. The magnitude of the time domain I and Q signal components may be normalized or adjusted to unity, or other desired value, to produce $\cos(\omega_{dn})$ and $\sin(\omega_{dn})$, respectively.

The I local oscillation 160* is represented as $\cos(\omega_{RF}+\Phi_n)$ and the Q local oscillation 166* is represented as $\sin(\omega_{RF}+\Phi_n)$, where $\omega_{RF}$ represents the frequency of one or more local oscillation stages and $\Phi_n$ represents the phase information 162. For a direct conversion transmitter, $\omega_{RF}$ corresponds to the frequency of the RF signal 172. The phase information ($\Phi_n$) may be generated from the magnitudes of the original I and Q signal components based on $\tan^{-1}(A_Q/A_I)$. The phase information is then used to adjust the unity amplitude I and Q local oscillations to produce the I and Q local oscillations 160* and 166* of FIG. 7.

The first mixer mixes the normalized I symbol 158* with the I local oscillation 160* to produce the 1$^{st}$ up-conversion signal 168, which may be expressed as $\frac{1}{2}\cos(\omega_{RF}-\omega_{dn}-\Phi_n)+\frac{1}{2}\cos(\omega_{RF}+\omega_{dn}+\Phi_n)$. The second mixer mixes the normalized Q symbol 164* with the Q local oscillation 166* to produce the second up-conversion signal 170, which may be expressed as $\frac{1}{2}\cos(\omega_{RF}-\omega_{dn}-\Phi_n)-\frac{1}{2}\cos(\omega_{RF}+\omega_{dn}+\Phi_n)$.

When the first and second up-conversions signals 168 and 170 are combined, the resulting RF signal 172 may be expressed as $\cos(\omega_{RF}+\omega_{dn}+\Phi_n)$. The power amplifier circuit 156 adjusts the amplitude of the RF signal 172 based on the amplitude information ($A_n$) 174 to produce the amplitude and phase modulated RF signal 176, which may be expressed as $A_n \cos(\omega_{RF}+\omega_{dn}+\Phi_n)$.

Figure 8:
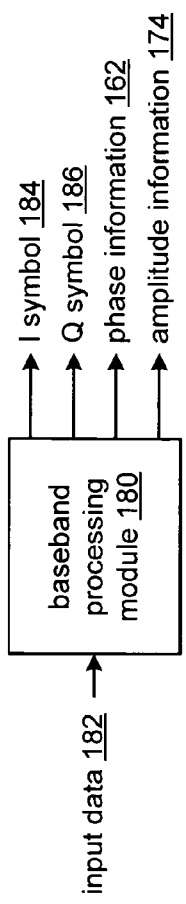
FIG. 8 is a schematic block diagram of an embodiment of a baseband processing module in accordance with the present invention.

FIG. 8 is a schematic block diagram of an embodiment of a baseband processing module 180, which may be incorporated in processing module 76 of FIG. 2 and/or processing module 100 of FIG. 3. In this embodiment, the baseband processing module 180 receives input data 182, which may be outbound data 94 of FIGS. 2 and/or 3, and produces therefrom an I symbol 184, a Q symbol 186, phase information 162, and amplitude information 174. With reference to the example of FIG. 4, the I symbol 184 is represented as the vector along the I axis with a magnitude corresponding to 10 and the Q symbol 186 is represented as the vector along the Q axis with a magnitude corresponding to 01.

Returning to the discussion of FIG. 8, the phase information 162 and amplitude information 174 are generated based on the I and Q symbols 184 and 186. For example, if the magnitude of the I symbol 184 is expressed as $A_I$ and the magnitude of the Q symbol 186 is expressed as $A_Q$, then the phase information ($\Phi_n$) may be determined as $\tan^{-1}(A_Q/A_I)$ and the amplitude information ($A_n$) may be determined as $(A_I^2+A_Q^2)^{1/2}$.

Figure 9:
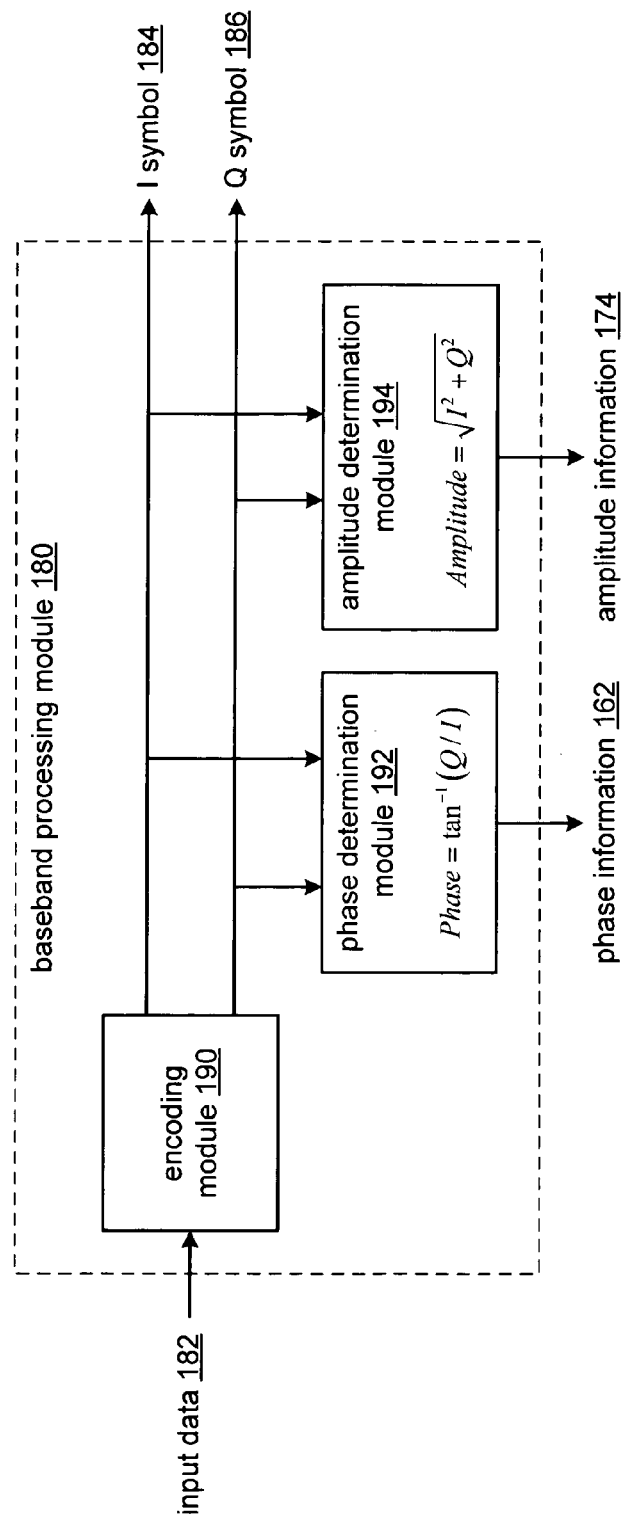
FIG. 9 is a schematic block diagram of another embodiment of a baseband processing module in accordance with the present invention.

FIG. 9 is a schematic block diagram of another embodiment of a baseband processing module 180 that includes an encoding module 190, a phase determination module 192, and an amplitude determination module 194. In this embodiment, the encoding module 190, which may include a ½ rate, ⅔ rate, or ¾ rate convolution encoder and a mapping function, encodes a digital value of the input data 182 to produce the I and Q symbols 184 and 186. For example, with reference to FIG. 4, digital value of 01 may be ½ rate encoded into a value of 10 01. The encoded value of 10 01 is then mapped to an I symbol 184 of 10 and a Q symbol 186 of 01.

Returning to the discussion of FIG. 9, the phase determination module 192 determines the phase information 192 based on the I and Q symbols 184 and 186. In this embodiment, the phase determination module 192 determines the phase information as $\tan^{-1}(Q/I)$, where Q represents the magnitude of the Q symbol 186 and I represents the magnitude of the I symbol 184.

The amplitude determination module 194 determines the amplitude information 174 based on the I and Q symbols 184 and 186. In this embodiment, the amplitude determination module 194 determines the amplitude information 174 as $(I^2+Q^2)^{1/2}$, where Q represents the magnitude of the Q symbol 186 and I represents the magnitude of the I symbol 184.

Figure 10:
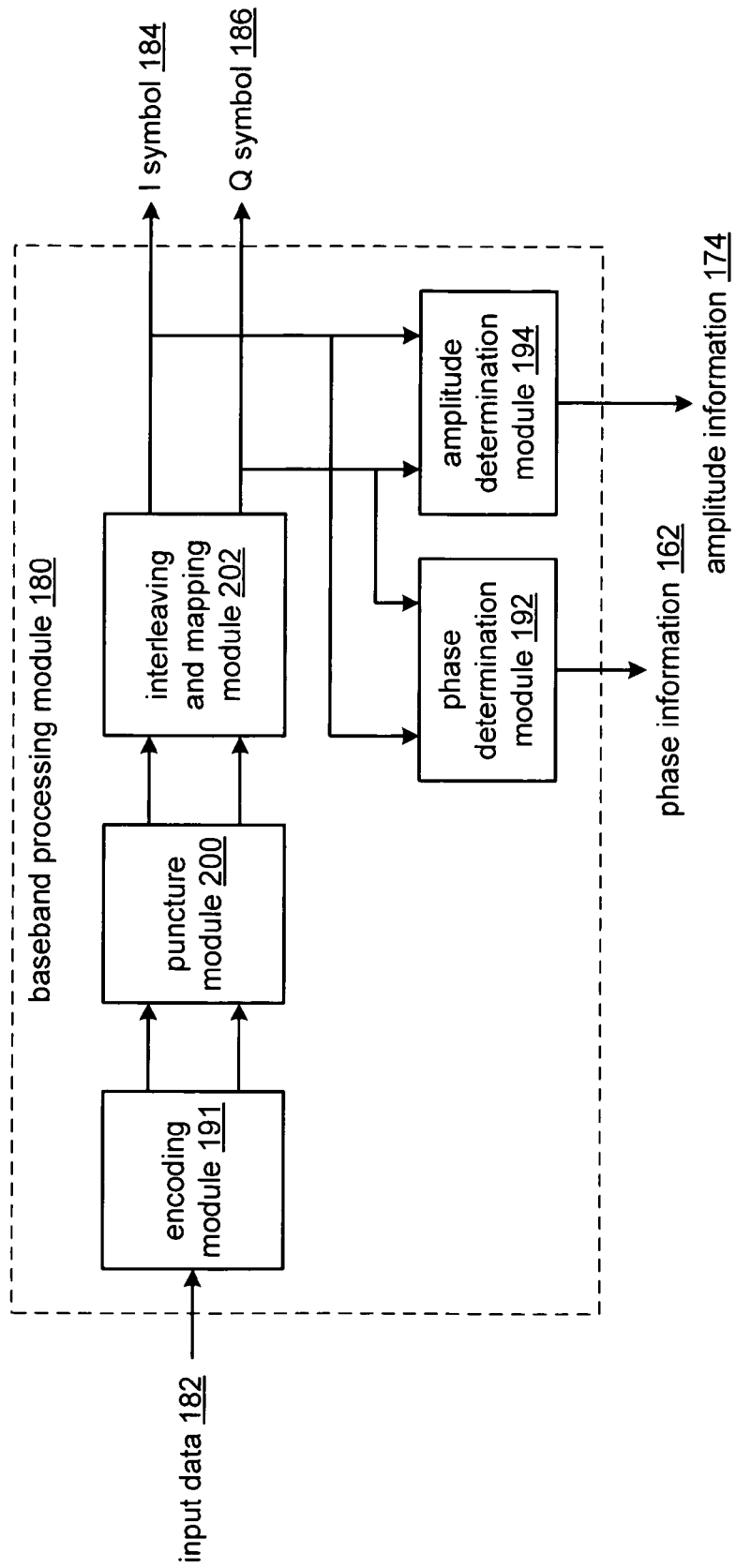
FIG. 10 is a schematic block diagram of another embodiment of a baseband processing module in accordance with the present invention.

FIG. 10 is a schematic block diagram of another embodiment of a baseband processing module 180 that includes an encoding module 191, a puncture module 200 (which may be omitted), an interleaving and mapping module 202, the phase determination module 192, and the amplitude determination module 194. In this embodiment, the input data 182 may be a stream of data that includes a plurality of digital values, which are processed by the baseband processing module 180 to produce a plurality of I and Q symbols 184 and 186.

In operation, the encoding module 190, which may be a ±½ rate, ⅔ rate, or ¾ rate convolution encode, encodes the plurality of digital values to produce a plurality of encoded values. For example, if the encoding module 190 performs ½ rate convolutional encoding (e.g., $r_0=b_0+S_0$; $r_1=b_0+S_0+S_1$) on a plurality of two-bit digital values (e.g., 10 11 01 00), the encoding module 190 produces a plurality of four-bit encoded values (e.g., 1101 0010 1000 0111). If the puncture module 200 is included, certain bits of the plurality of encoded values are don't care values.

The mapping and interleaving module 202 receives the plurality of encoded values, interleaves them and then maps the interleaved values to the plurality of I and Q symbols. For example, four of the 4-bit encoded values may be generally expressed as $b0_0, b0_1, b0_2, b0_3$; $b1_0, b1_1, b1_2, b1_3$; $b2_0, b2_1, b2_2, b2_3$; and $b3_0, b3_1, b3_2 b3_3$. The interleaving function of the mapping and interleaving module 202 may interleave the four 4-bit encoded values to produce four 4-bit interleaved values of $b0_0, b1_1, b2_2, b3_3$; $b1_0, b2_1, b3_2, b0_3$; $b2_0, b3_1, b0_2, b1_3$; and $b3_0, b0_1, b1_2, b2_3$. Continuing with the present example, the four 4-bit interleaved values are 1001; 0011; 1100; and 0110.

The mapping function of the mapping and interleaving module 202 maps the plurality of interleaved values into the plurality of I and Q symbols, or values, 184 and 186. Continuing with the present example, the interleaved value of 1001 is mapped to an I symbol of 10 and a Q symbol of 01, the interleaved value of 0011 is mapped to an I symbol of 00 and a Q symbol of 11, the interleaved value of 1100 is mapped to an I symbol of 11 and a Q symbol of 00, and the interleaved value of 0110 is mapped to an I symbol of 01 and a Q symbol of 10.

For each corresponding pair of I and Q symbols, the phase determination module 192 determines phase information 162 and the amplitude determination module 194 determines amplitude information 174. Continuing with the present example, phase and amplitude information 162 and 174 is separately generated for the I and Q symbol pairs of 10 01; 00 11; 11 00; and 01 10.

Figure 11:
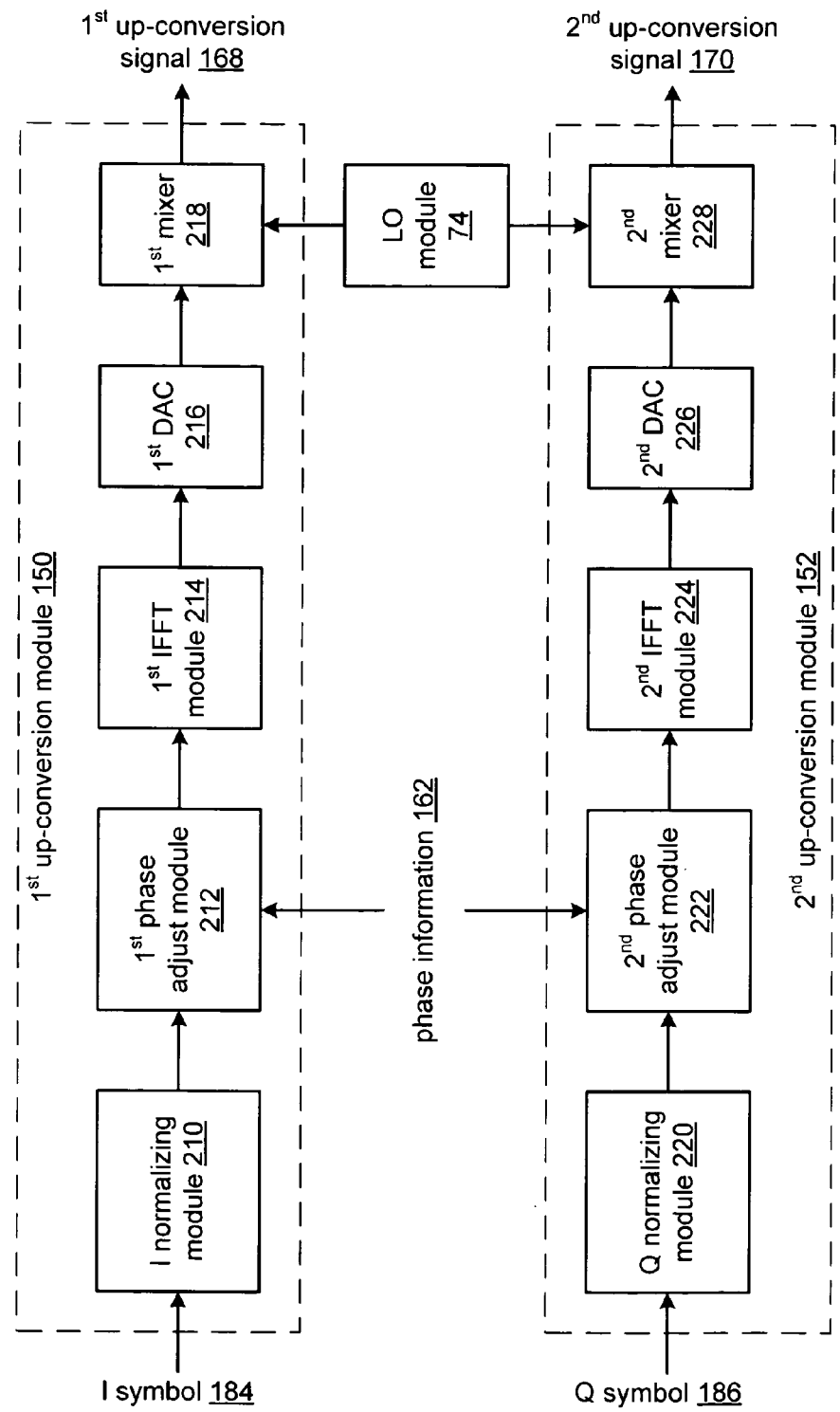
FIG. 11 is a schematic block diagram of an embodiment of up-conversion modules in accordance with the present invention.

FIG. 11 is a schematic block diagram of an embodiment of up-conversion modules 150 and 152 coupled to the local oscillation module 74. In this embodiment, the $1^{st}$ up-conversion module 150 includes an I normalizing module 210, a $1^{st}$ phase adjust module 212, a $1^{st}$ IFFT (inverse fast Fourier transform) module 214, a $1^{st}$ DAC (digital to analog conversion) module 216, and a $1^{st}$ mixer 218. The $2^{nd}$ up-conversion module 152 includes a Q normalizing module 220, a $2^{nd}$ phase adjust module 222, a $2^{nd}$ IFFT module 224, a $2^{nd}$ DAC module 216, and a $2^{nd}$ mixer 228.

In operation, the I normalizing module 210 receives an I symbol 184, which may be produced by one of the baseband processing modules of FIGS. 8-10, and normalizes the amplitude of the I symbol 184 to produce an amplitude normalized I symbol. In parallel, the Q normalizing module 220 receives a Q symbol 186, which may be produced by one of the baseband processing modules of FIGS. 8-10, and normalizes the amplitude of the Q symbol 186 to produce an amplitude normalized Q symbol. For example, the I symbol 184 may be representative of a frequency domain sine wave (e.g., frequency domain representation of $A_I \cos(\omega_{dn})$), which the I normalizing module 210 adjusts the amplitude $A_I$ to unity or another constant value and the Q symbol 186 may be representative of a frequency domain sine wave (e.g., frequency domain representation of $A_Q \sin(\omega_{dn})$), which the Q normalizing module 220 adjusts the amplitude $A_Q$ to unity or another constant value.

The $1^{st}$ and $2^{nd}$ phase adjust modules 212 and 222, respectively adjust the phase of the amplitude normalized I and Q symbols based on the phase information to produce phase adjusted and normalized I and Q symbols. For example, the phase adjust modules may adjust the phase of the amplitude normalized I symbol (e.g., frequency domain representation of $\cos(\omega_{dn})$) and the amplitude normalized Q symbol (e.g., frequency domain representation of $\sin(\omega_{dn})$) by the phase information ($\Phi_n$) to produce the phase and normalized I and Q symbols (e.g., frequency domain representations of $\cos(\omega_{dn}+\Phi_n)$ and $\cos(\omega_{dn}+\Phi_n)$). In one embodiment, the phase adjust modules 212 and 222 implement the function of $\sin(\alpha+\beta)=\sin\alpha^*\cos\beta+\cos\alpha^*\sin\beta$ and $\cos(\alpha+\beta)=\cos\alpha^*\cos\beta+\sin\alpha^*\sin\beta$, where $\alpha$ corresponds to $\omega_{dn}$ and $\beta$ corresponds to $\Phi_n$ to produce the phase and normalized I and Q symbols.

The $1^{st}$ and $2^{nd}$ inverse fast Fourier transform modules 214 and 224 are operably coupled to convert the phase adjusted and normalized I and Q symbols into a time domain phase adjusted and normalized I symbol. Note that the ordering of the phase adjust modules 212 and 222 and the IFFT modules 214 and 224 may be reversed. Further note that the phase adjust modules 212 and 222 may be analog circuits that follow the DACs 216 and 226.

The $1^{st}$ and $2^{nd}$ DACs 216 and 226 are operably coupled to convert the time domain phase adjusted and normalized I and Q symbols into a normalized I and Q symbols with phase adjustment (e.g., analog signals that may be expressed as $\cos(\omega_{dn}+\Phi_n)$ and $\sin(\omega_{dn}+\Phi_n)$) The $1^{st}$ and $2^{nd}$ mixers 218 and 228 are operably coupled to mix the normalized I symbol with phase adjustment with the in-phase local oscillation to produce the $1^{st}$ up-conversion signal 168 and mix the normalized Q symbol with phase adjustment with the quadrature local oscillation to produce the $2^{nd}$ up-conversion signal 170.

Figure 12:
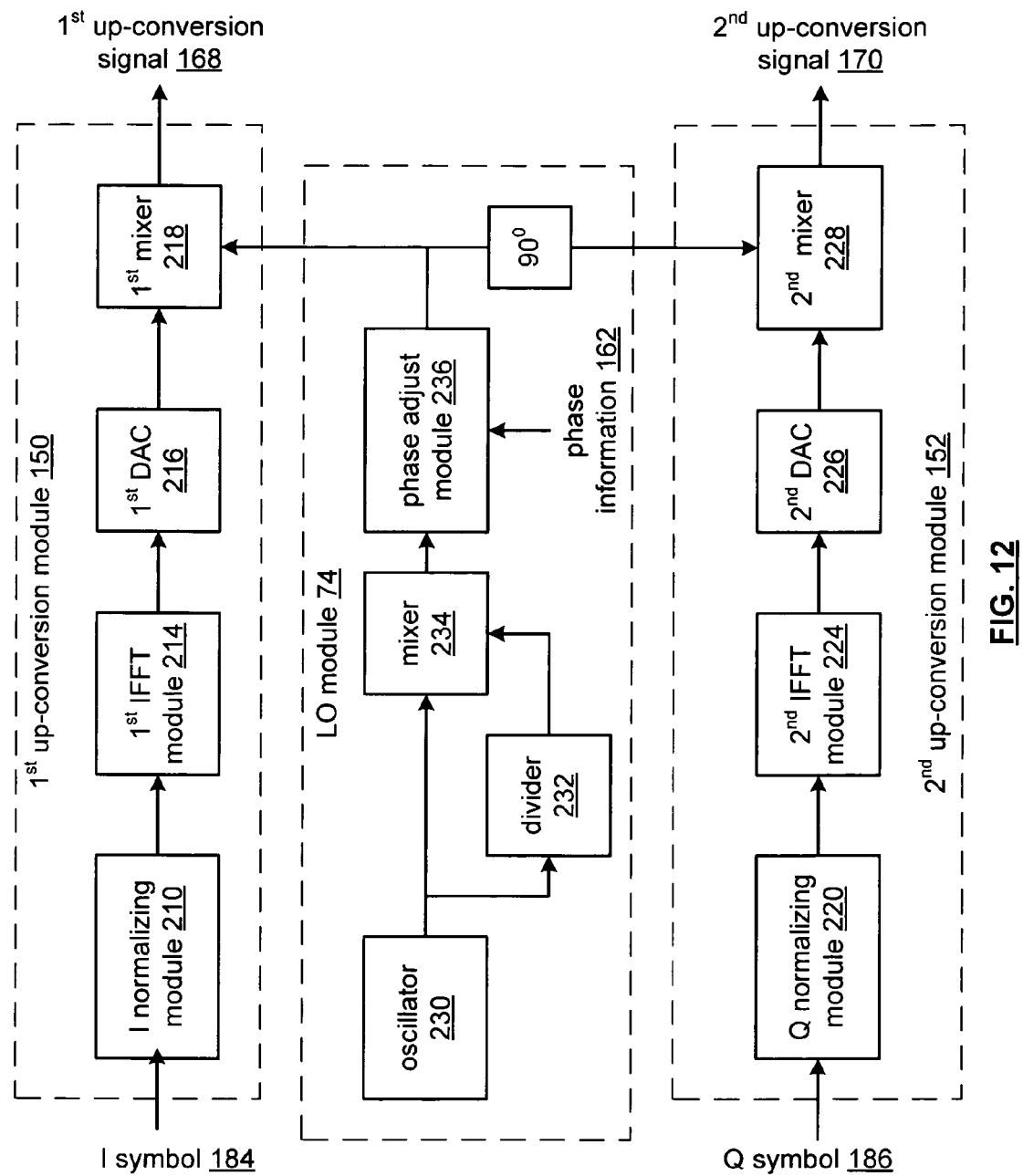
FIG. 12 is a schematic block diagram of an embodiment of up-conversion modules and a local oscillation module in accordance with the present invention.

FIG. 12 is a schematic block diagram of an embodiment of the $1^{st}$ and $2^{nd}$ up-conversion modules 150 and 152 operably coupled to an embodiment of the local oscillation module 74. In this embodiment, the $1^{st}$ up-conversion module 150 includes the I normalizing module 210, the $1^{st}$ IFFT module 214, the $1^{st}$ DAC 216, and the $1^{st}$ mixer 218. The $2^{nd}$ up-conversion module 152 includes the Q normalizing module 220, the $2^{nd}$ IFFT module 224, the $2^{nd}$ DAC 226, and the $2^{nd}$ mixer 228. Comparing the embodiments of the $1^{st}$ and $2^{nd}$ up-conversion modules of FIG. 12 with the embodiments of the $1^{st}$ and $2^{nd}$ up-conversion modules of FIG. 11 reveals that the embodiments of FIG. 12 do not include the phase adjust modules 212 and 222. With this exception, the embodiments of the $1^{st}$ and $2^{nd}$ up-conversion modules of FIG. 12 function similar to the embodiments of FIG. 11 to produce the $1^{st}$ and $2^{nd}$ up-conversion signals 168 and 170 from the I and Q symbols 184 and 186. In this embodiment, the $1^{st}$ and $2^{nd}$ up-conversion signals 168 and 170 are analog signals that may be expressed as $\cos(\omega_{dn})$ and $\sin(\omega_{dn})$.

The local oscillation module 74 includes an oscillator 230, a divider 232, a mixer 234, a phase adjust module 236, and a 90° phase shift module. In operation, the oscillator 234, which may include a crystal oscillator and a phase locked loop, produces an oscillation at a frequency that is a fraction of the desired frequency of the local oscillation. For example, if the desired frequency of the local oscillation is 2.4 GHz, then the frequency of the oscillator may be 1.6 GHz. Alternatively, if the desired frequency of the local oscillation is 5.1 GHz, then the frequency of the oscillator may be 3.4 GHz.

The divider module 232, which may be a divide by two module, divides the frequency of the oscillation to produce a reduced frequency oscillation. For example, the reduced frequency oscillation may be 800 MHz for a 1.6 GHz oscillator and a 1.7 GHz oscillation for a 3.4 GHz oscillator. The mixer 234 is operably coupled to mix the oscillation with the reduced frequency oscillation to produce a local oscillation (e.g., $\cos(\omega_{LO})$). For example, the mixer 234 mixes the 800 MHz reduced frequency oscillation with the 1.6 GHz oscillation to produce a 2.4 GHz local oscillation. Alternatively, the mixer 234 mixes the 1.7 GHz reduced frequency oscillation with the 3.4 GHz oscillation to produce a 5.1 GHz local oscillation.

The phase adjusting module 236 operably coupled to adjust phase of the local oscillation (e.g., $\cos(\omega_{LO})$) based on the phase information ($\Phi_n$) to produce a phase adjusted local oscillation (e.g., $\cos(\omega_{LO}+\Phi_n)$), which may be used as the I local oscillation. The 900 phase shift module converts the local oscillation into a Q local oscillation (e.g., $\sin(\omega_{LO}+\Phi_n)$). In one embodiment, the phase adjusting module 236 includes a plurality of delay lines that replicate the local oscillation with varying phase offsets. In this instance, the phase information 162 is used to select a particular one of the plurality of delay lines.

Figure 13:
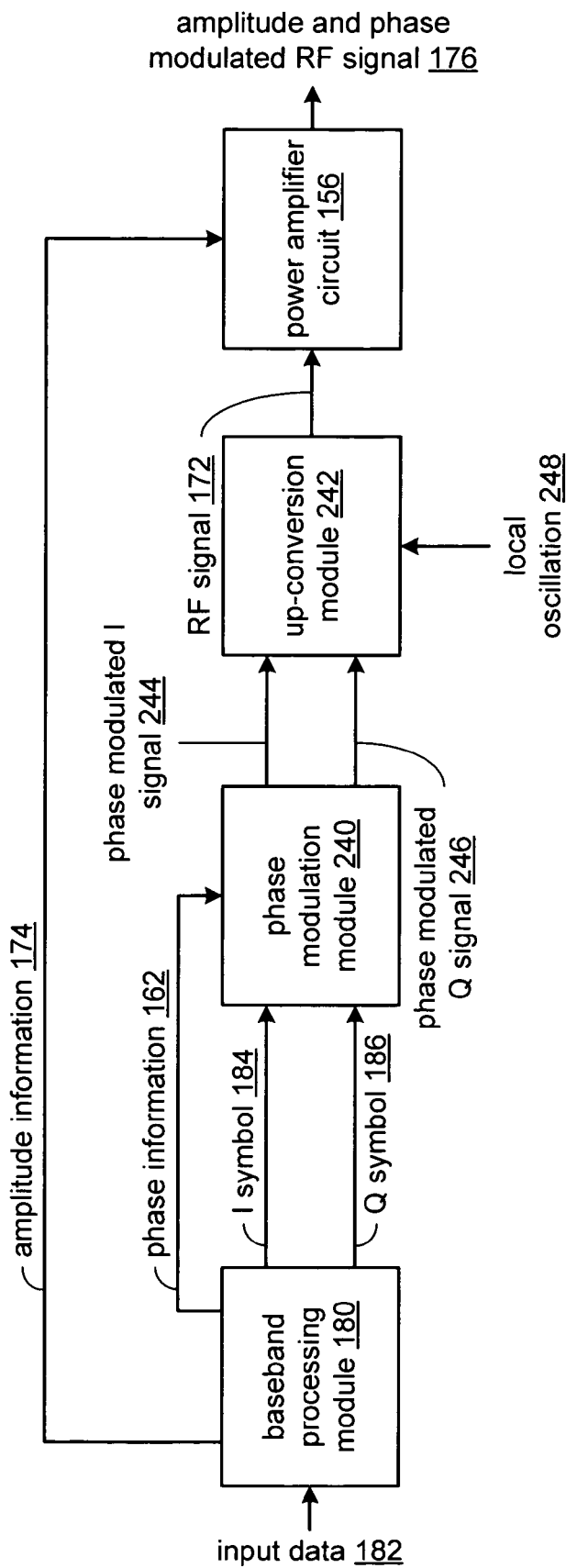
FIG. 13 is a schematic block diagram of another embodiment of a hybrid transmitter in accordance with the present invention.

FIG. 13 is a schematic block diagram of another embodiment of a hybrid transmitter that includes the baseband processing module 180, a phase modulation module 240, an up-conversion module 242, and the power amplifier circuit 156. The baseband processing module generates phase information 162, amplitude information 174, I symbol 184, and Q symbol 186 from input data 182 as previously discussed with reference to FIGS. 8-10.

The phase modulation module 240 is operably coupled to generate a phase modulated I signal 244 from the I symbol 184 based on the phase information 162 and to generate a phase modulated Q signal 246 from the Q symbol 186 based on the phase information 162. In one embodiment, the phase modulation module 240 may include I and Q normalizing modules 210 and 220, $1^{st}$ and $2^{nd}$ phase adjust modules 212 and 22, $1^{st}$ and $2^{nd}$ IFFT modules 214 and 224, and $1^{st}$ and $2^{nd}$ DACs 216 and 226.

The up-conversion module 242 generates an RF signal 172 from the phase modulated I and Q signals 244 and 246 and the local oscillation 248. In one embodiment, the up-conversion module 242 includes a first mixer, a second mixer, and a summing or subtracting module. The first mixer mixes the phase modulated I signal 244 with an I component of the local oscillation 248 to produce a first mixed signal. The second mixer mixes the phase modulated Q signal 246 with a Q component of the local oscillation to produce a second mixed signal. The summing or subtracting module combines the first and second mixed signals to produce the RF signal 172. Note that $\sin \alpha * \sin \beta = \frac{1}{2} \cos(\alpha-\beta) - \frac{1}{2} \cos(\alpha+\beta)$; $\cos \alpha * \cos \beta = \frac{1}{2} \cos(\alpha-\beta) + \frac{1}{2} \cos(\alpha+\beta)$; $\sin \alpha * \cos \beta = \frac{1}{2} \sin(\alpha+\beta) + \frac{1}{2} \sin(\alpha-\beta)$; and $\cos \alpha * \sin \beta = \frac{1}{2} \sin(\alpha+\beta) - \frac{1}{2} \sin(\alpha-\beta)$. As such, selecting I and Q to be sine or cosine and selecting LO-I and LO-Q to be sine or cosine determines whether the first and second mixed signals are added together or one is subtracted from the other.

The power amplifier circuit 156 amplitude modulates the RF signal 172 based on the amplitude information 174 to produce an amplitude and phase shifted RF signal 176. In one embodiment, the amplitude modulation may be achieved by adjusting the supply voltage to the power amplifier circuit 156. In another embodiment, gain of the power amplifier circuit 156 may be adjusted based on the amplitude information 174 to achieve the amplitude modulation.

Figure 14:
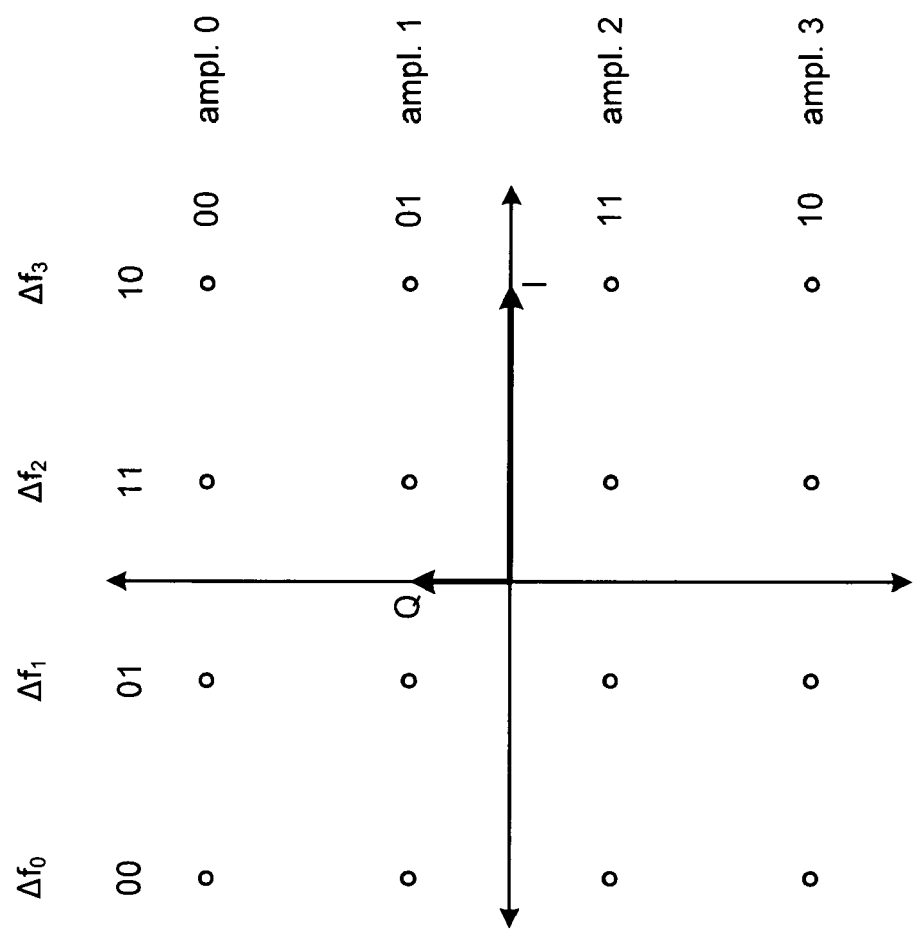
FIG. 14 is a diagram of an example of mapping an encoded value into Cartesian coordinates and into frequency-amplitude coordinates.

FIG. 14 is a diagram of an example of mapping an encoded value into Cartesian coordinates and into frequency-amplitude coordinates. In this example, a 4-bit value may be mapped into one of sixteen Cartesian coordinates (e.g., I and Q symbols) and into one of sixteen frequency-amplitude modulation coordinates. As shown, the horizontal axis corresponds to an I axis for Cartesian coordinates and to a $\Delta f$ axis for frequency amplitude modulation coordinates. The vertical axis corresponds to a Q axis for Cartesian coordinates and to an amplitude axis for frequency amplitude modulation coordinates. As a specific example, a digital value of 1001 may be mapped to Cartesian coordinates of I and Q as shown and to a frequency-amplitude modulation coordinates of $\Delta f_3$ and amplitude 1. Note that if the constellation map includes four points, the modulation scheme may be Frequency Shift Keying (FSK) with amplitude modulation.

Figure 15:
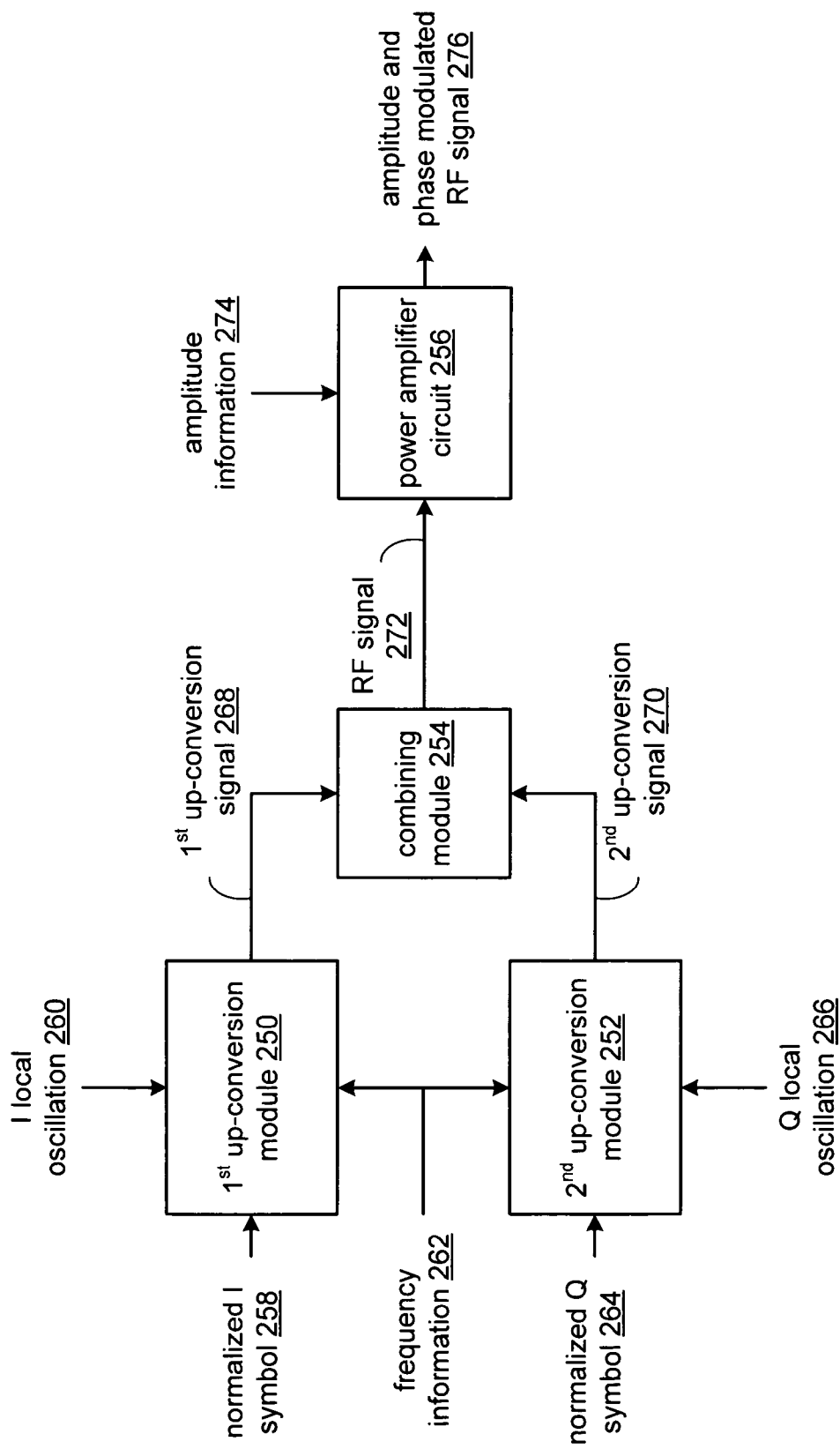
FIG. 15 is a schematic block diagram of another embodiment of a hybrid transmitter in accordance with the present invention.

FIG. 15 is a schematic block diagram of another embodiment of a hybrid transmitter includes a $1^{st}$ up-conversion module 250, a $2^{nd}$ up-conversion module 252, a combining module 254, and a power amplifier circuit 256. The power amplifier circuit 256 may include one or more power amplifiers and/or one or more input power amplifier stages. When the power amplifier circuit 256 includes more than one power amplifier and/or input power amplifier stages, the power amplifiers and/or input power amplifier stages may be in series and/or in parallel.

The $1^{st}$ up-conversion module 250, embodiments may be similar to the embodiments of the $1^{st}$ up-conversion module 150 discussed in FIGS. 11 and 12 with a frequency adjust module replacing the phase adjust module, generates a $1^{st}$ up-conversion signal 268 based on a normalized in-phase (I) symbol 258, an in-phase (I) local oscillation 260, and frequency information 262. The $2^{nd}$ up-conversion module 252, embodiments may be similar to the embodiments of the $2^{st}$ up-conversion module 250 discussed in FIGS. 11 and 12 with a frequency adjust module replacing the phase adjust module, generates a $2^{nd}$ up-conversion signal 270 based on a normalized quadrature symbol 264, a quadrature (Q) local oscillation 266, and frequency information 262.

Figure 16:
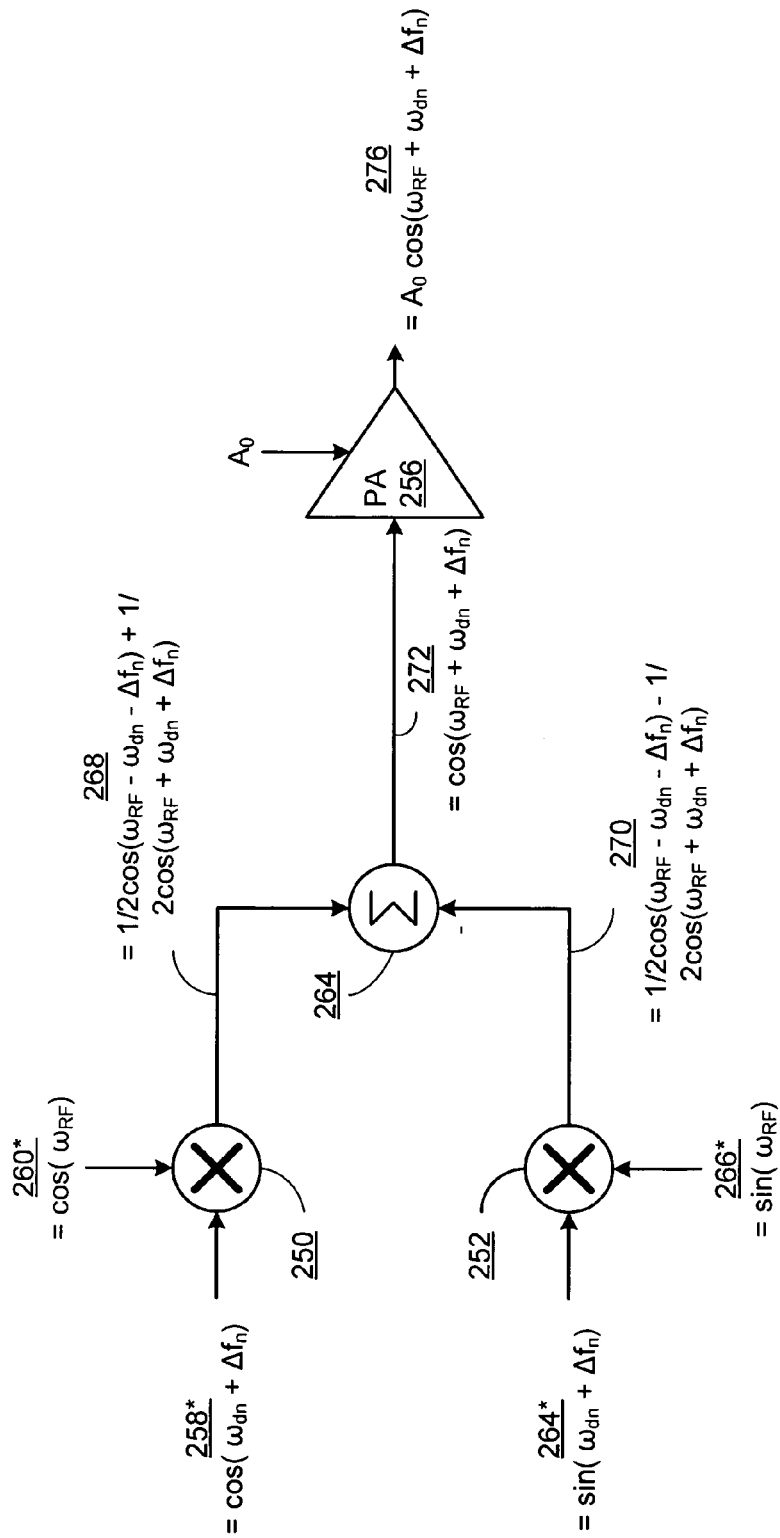
FIG. 16 is a functional diagram of yet another embodiment of a hybrid transmitter in accordance with the present invention.
Figure 17:
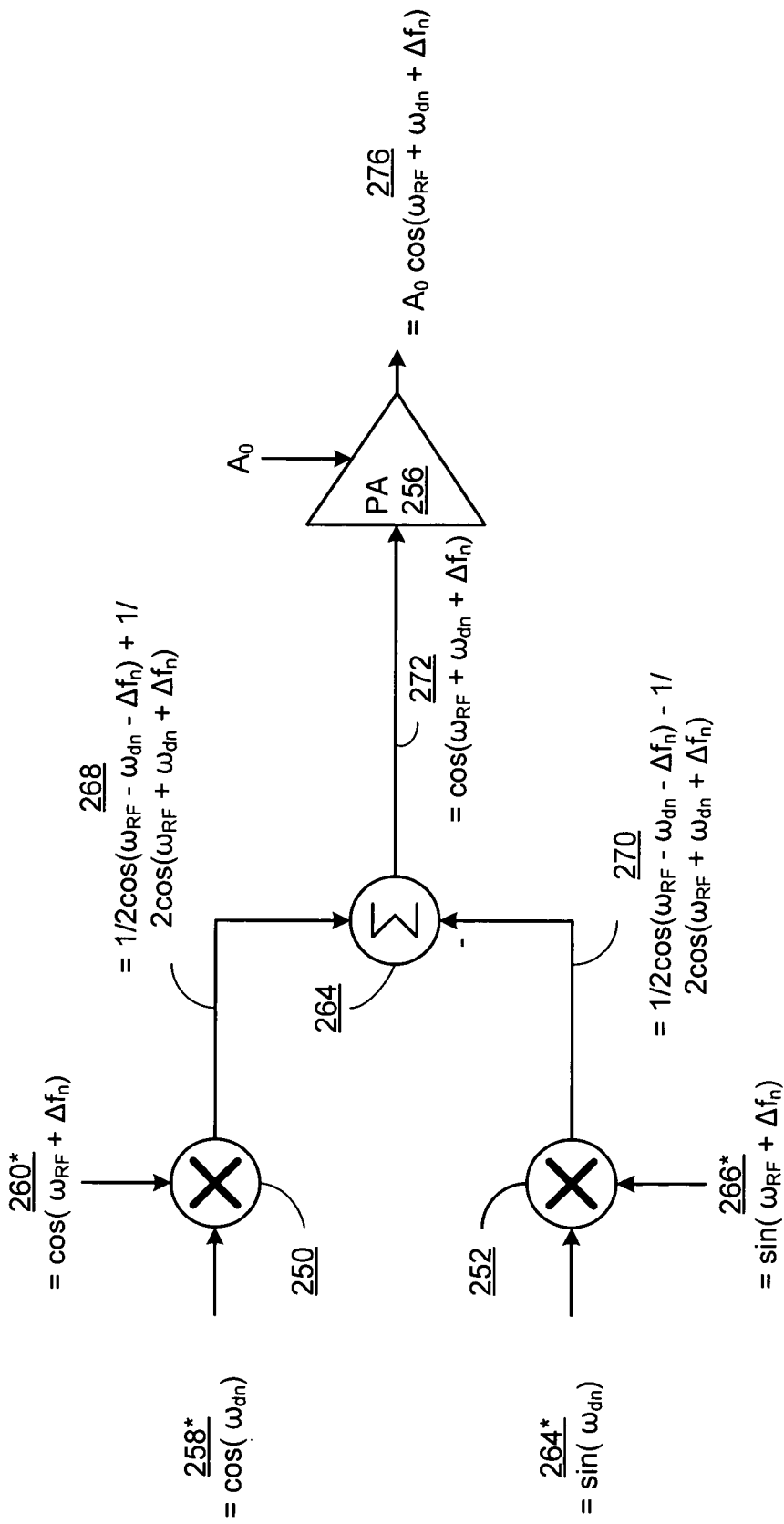
FIG. 17 is a functional diagram of a further embodiment of a hybrid transmitter in accordance with the present invention.

The combining module 254, embodiments of which will be discussed in greater detail with reference to FIGS. 16 and 17, is operably coupled to combine the first and second up-conversion signals to produce a radio frequency (RF) signal 272. The power amplifier circuit 256 is operably coupled to adjust the amplitude of the RF signal 272 based on amplitude information 274 to produce an amplitude and frequency modulated RF signal 276. Note that the hybrid transmitter of FIG. 15 may incorporate modules 76, 78, 80, 82, and 84 of FIG. 2 and/or modules 100 & 106, 108, and/or 110 of FIG. 3.

FIG. 16 is a functional diagram of an embodiment of a hybrid transmitter that includes a first mixer as at least part of the $1^{st}$ up-conversion module 250, a second mixer as at least part of the $2^{nd}$ up-conversion module 252, a subtraction module as the combining module 254, and the power amplifier circuit 256. In this embodiment, the normalized I symbol 258* is expressed as $\cos(\omega_{dn}+\Delta f_n)$ and the normalized Q symbol 264* is expressed as $\sin(\omega_{dn}+\Delta f_n)$, where $\omega_{dn}$ represents the frequency of the mapped and interleaved data and $\Delta f_n$ represents the frequency information 262. For example, $\omega_{dn}$ may correspond to the frequency of a subcarrier of an OFDM signal, where n represents the number of the subcarrier. Further, the OFDM signal may include a 20 MHz wide channel consisting of 64 subcarrier frequencies, where the subcarriers are frequency spaced by 312.5 KHz. Thus, for subcarrier number 10, $\omega_{d10}$ represents $2*\pi*10*312.5$ KHz.

As an example, the normalized I and Q symbols 258* and 264* may be generated from I and Q components. With reference to FIG. 14, the encoded value of 10 01 is mapped to an I value of 10 and a Q value of 01. For Cartesian coordinates, the time domain I signal component may be expressed as $A_I \cos(\omega_{dn})$ and the time domain Q component may be expressed as $A_Q \sin(\omega_{dn})$, where $A_I$ is based on 10 and $A_Q$ is based on 01. The magnitude of the time domain I and Q signal components may be normalized or adjusted to unity, or other desired value, to produce $\cos(\omega_{dn})$ and $\sin(\omega_{dn})$, respectively. The frequency information ($\Delta f_n$) may be generated from the magnitude of the original I signal ($A_I$). The frequency information is then used to adjust the unity amplitude I and Q signals to produce the normalized I and Q symbols 258* and 264* of FIG. 16.

The I local oscillation 260* is represented as $\cos(\omega_{RF})$ and the Q local oscillation 266* is represented as $\sin(\omega_{RF})$, where $\omega_{RF}$ represents the frequency of one or more local oscillation stages. For a direct conversion transmitter, $\omega_{RF}$ corresponds to the frequency of the RF signal 272. The first mixer mixes the normalized I symbol 258* with the I local oscillation 260* to produce the $1^{st}$ up-conversion signal 268, which may be expressed as $\frac{1}{2} \cos(\omega_{RF}-\omega_{dn}-\Delta f_n) + \frac{1}{2} \cos(\omega_{RF}+\omega_{dn}+\Delta f_n)$. The second mixer mixes the normalized Q symbol 264* with the Q local oscillation 266* to produce the second up-conversion signal 270, which may be expressed as $\frac{1}{2} \cos(\omega_{RF}-\omega_{dn}-\Delta f_n) - \frac{1}{2} \cos(\omega_{RF}+\omega_{dn}+\Delta f_n)$.

When the first and second up-conversions signals 268 and 270 are combined, the resulting RF signal 272 may be expressed as $\cos(\omega_{RF}+\omega_{dn}+\Delta f_n)$. The power amplifier circuit 256 adjusts the amplitude of the RF signal 272 based on the amplitude information ($A_n$) 274 to produce the amplitude and frequency modulated RF signal 276, which may be expressed as $A_n \cos(\omega_{RF}+\omega_{dn}+\Delta f_n)$. Note that the amplitude information 274 may be derived from the amplitude of the Q symbol ($A_Q$).

FIG. 17 is a functional diagram of another embodiment of a hybrid transmitter that includes a first mixer as at least part of the $1^{st}$ up-conversion module 250, a second mixer as at least part of the $2^{nd}$ up-conversion module 252, a subtraction module as the combining module 254, and the power amplifier circuit 256. In this embodiment, the normalized I symbol 258* is expressed as $\cos(\omega_{dn})$ and the normalized Q symbol 264* is expressed as $\sin(\omega_{dn})$, where $\omega_{dn}$ represents the frequency of the mapped and interleaved data. As an example, the normalized I and Q symbols 258* and 264* may be generated from I and Q components. With reference to FIG. 14, the encoded value of 10 01 is mapped to an I value of 10 and a Q value of 01. For Cartesian coordinates, the time domain I signal component may be expressed as $A_I \cos(\omega_{dn})$ and the time domain Q component may be expressed as $A_Q \sin(\omega_{dn})$, where $A_I$ is based on 10 and $A_Q$ is based on 01. The magnitude of the time domain I and Q signal components may be normalized or adjusted to unity, or other desired value, to produce $\cos(\omega_{dn})$ and $\sin(\omega_{dn})$, respectively.

The I local oscillation 260* is represented as $\cos(\omega_{RF}+\Delta f_n)$ and the Q local oscillation 266* is represented as $\sin(\omega_{RF}+\Delta f_n)$, where $\omega_{RF}$ represents the frequency of one or more local oscillation stages and $\Delta f_n$ represents the frequency information 262. For a direct conversion transmitter, $\omega_{RF}$ corresponds to the frequency of the RF signal 272. The frequency information ($\Delta f_n$) may be generated from the magnitude of the original I signal components ($A_I$). The frequency information is then used to adjust the unity amplitude I and Q local oscillations to produce the I and Q local oscillations 260* and 266* of FIG. 17.

The first mixer mixes the normalized I symbol 258* with the I local oscillation 260* to produce the $1^{st}$ up-conversion signal 268, which may be expressed as $\frac{1}{2}\cos(\omega_{RF}-\omega_{dn}-\Delta f_n)+\frac{1}{2}\cos(\omega_{RF}+\omega_{dn}+\Delta f_n)$. The second mixer mixes the normalized Q symbol 264* with the Q local oscillation 266* to produce the second up-conversion signal 270, which may be expressed as $\frac{1}{2}\cos(\omega_{RF}-\omega_{dn}-\Delta f_n)-\frac{1}{2}\cos(\omega_{RF}+\omega_{dn}+\Delta f_n)$.

When the first and second up-conversions signals 168 and 170 are combined, the resulting RF signal 272 may be expressed as $\cos(\omega_{RF}+\omega_{dn}+\Delta f_n)$. The power amplifier circuit 256 adjusts the amplitude of the RF signal 272 based on the amplitude information ($A_n$) 274 to produce the amplitude and frequency modulated RF signal 276, which may be expressed as $A_n \cos(\omega_{RF}+\omega_{dn}+\Delta f_n)$.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has present numerous embodiments of a hybrid transmitter that combines the benefits of a Cartesian based transmitter with a Polar coordinate based transmitter or frequency modulated based transmitter. As one of ordinary skill in the art will appreciate, other embodiments may be derived from the teachings of the present invention without deviating from the scope of the claims.

What is claimed is:

1. A hybrid transmitter comprises:
   a baseband processing module operably coupled to:
   convert input data into an in-phase (I) symbol and a quadrature (Q) symbol;
   generate phase information based on the I and Q symbols; and
   generate amplitude information based on the I and Q symbols;
   a first up-conversion module operably coupled to generate a first up-conversion signal based on a magnitude-normalized in-phase (I) symbol, an in-phase local oscillation, and the phase information, the first up-conversion module including:
   an I normalizing module operably coupled to normalize amplitude of the I symbol to produce an amplitude normalized I symbol;
   a first phase adjust module operably coupled to adjust phase of the amplitude normalized I symbol based on the phase information to produce a phase adjusted and normalized I symbol;
   a first inverse fast Fourier transform module operably coupled to convert the phase adjusted and normalized I symbol into a time domain phase adjusted and normalized I symbol;
   a first digital to analog converter operably coupled to convert the time domain phase adjusted and normalized I symbol into a normalized I symbol with phase adjustment; and
   a first mixer operably coupled to mix the normalized I symbol with phase adjustment and with the in-phase local oscillation to produce the first up-conversion signal;
   a second up-conversion module operably coupled to generate a second up-conversion signal based on a magnitude-normalized quadrature (Q) symbol, a quadrature local oscillation, and the phase information, the second up-conversion module including:
   a Q normalizing module operably coupled to normalize amplitude of the Q symbol to produce an amplitude normalized Q symbol;
   a second phase adjust module operably coupled to adjust phase of the amplitude normalized Q symbol based on the phase information to produce a phase adjusted and normalized Q symbol;
   a second inverse fast Fourier transform module operably coupled to convert the phase adjusted and normalized Q symbol into a time domain phase adjusted and normalized Q symbol;

a second digital to analog converter operably coupled to convert the time domain phase adjusted and normalized Q symbol into a normalized Q symbol with phase adjustment; and a second mixer operably coupled to mix the normalized Q symbol with phase adjustment and with the quadrature local oscillation to produce the second up-conversion signal;

a combining module operably coupled to combine the first and second up-conversion signals to produce a radio frequency (RF) signal; and a power amplifier circuit operably coupled to adjust amplitude of the RF signal based on the amplitude information to produce an amplitude and phase modulated RF signal.

2. The hybrid transmitter of claim 1, wherein the baseband processing module comprises:

an encoding module operably coupled to convert the input data into the I and Q symbols;

a phase determination module operably coupled to determine the phase information based on an inverse tangent of the Q symbol and the I symbol; and an amplitude determination module operably coupled to determine the amplitude information based on a square root of a sum of magnitude of the I symbol squared and magnitude of the Q symbol squared.

3. The hybrid transmitter of claim 1, wherein the baseband processing module comprises:

an encoding module operably coupled to encode a stream of data to produce a plurality of I symbol components and a plurality of Q symbol components, wherein the input data includes the stream of data;

a puncture module operably coupled to puncture the plurality of I symbol components and the plurality of Q symbol components to produce a plurality of punctured I symbol components and a plurality of punctured Q symbol components;

an interleaving module operably coupled to interleave the punctured I symbol components to produce a plurality of interleaved I symbols and to interleave the punctured Q symbol components to produce a plurality of interleaved Q symbols, wherein the plurality of interleaved I symbols includes the I symbol and the plurality of interleaved Q symbols includes the Q symbol;

a phase determination module operably coupled to determine the phase information based on an inverse tangent of the Q symbol and the I symbol; and an amplitude determination module operably coupled to determine the amplitude information based on a square root of a sum of magnitude of the I symbol squared and magnitude of the Q symbol squared.

4. The hybrid transmitter of claim 1 further comprises:

a local oscillation module that includes:

an oscillator operably coupled to produce an oscillation;

a divider operably coupled to divide frequency of the oscillation to produce a reduced frequency oscillation;

a mixer operably coupled to mix the oscillation with the reduced frequency oscillation to produce a local oscillation; and a phase adjusting module operably coupled to adjust phase of the local oscillation based on the phase information to produce a phase adjusted local oscillation, wherein a quadrature local oscillation with phase adjustment and an in-phase local oscillation with phase adjustment are derived from the phase adjusted local oscillation.

5. A hybrid transmitter comprises:

a baseband processing module operably coupled to:

convert input data into an in-phase (I) symbol and a quadrature (Q) symbol;

generate frequency information based on at least one of the I and Q symbols; and generate amplitude information based on at least one of the I and Q symbols;

a first up-conversion module operably coupled to generate a first up-conversion signal based on a magnitude-normalized in-phase (I) symbol, an in-phase local oscillation, and the frequency information;

a second up-conversion module operably coupled to generate a second up-conversion signal based on a magnitude-normalized quadrature (Q) symbol, a quadrature local oscillation, and the frequency information;

a combining module operably coupled to combine the first and second up-conversion signals to produce a radio frequency (RF) signal; and a power amplifier circuit operably coupled to adjust amplitude of the RF signal based on the amplitude information to produce an amplitude and frequency modulated RF signal.

6. The hybrid transmitter of claim 5, wherein the baseband processing module comprises:

an encoding module operably coupled to convert the input data into the I and Q symbols;

a frequency determination module operably coupled to determine the frequency information based on magnitude of one of the Q symbol and the I symbol; and an amplitude determination module operably coupled to determine the amplitude information based on magnitude of another of the Q symbol and the I symbol.

7. The hybrid transmitter of claim 5, wherein the baseband processing module comprises:

an encoding module operably coupled to encode a stream of data to produce a plurality of I symbol components and a plurality of Q symbol components, wherein the input data includes the stream of data;

a puncture module operably coupled to puncture the plurality of I symbol components and the plurality of Q symbol components to produce a plurality of punctured I symbol components and a plurality of punctured Q symbol components;

an interleaving module operably coupled to interleave the punctured I symbol components to produce a plurality of interleaved I symbols and to interleave the punctured Q symbol components to produce a plurality of interleaved Q symbols, wherein the plurality of interleaved I symbols includes the I symbol and the plurality of interleaved Q symbols includes the Q symbol;

a frequency determination module operably coupled to determine the frequency information based on magnitude of one of the Q symbol and the I symbol; and an amplitude determination module operably coupled to determine the amplitude information based on magnitude of another of the I symbol and the Q symbol.

8. The hybrid transmitter of claim 5 further comprises:

the first up-conversion module including:

an I normalizing module operably coupled to normalize amplitude of the I symbol to produce an amplitude normalized I symbol;

a first frequency adjust module operably coupled to adjust frequency of the amplitude normalized I symbol based on the frequency information to produce a frequency adjusted and normalized I symbol;

a first inverse fast Fourier transform module operably coupled to convert the frequency adjusted and normalized I symbol into a time domain frequency adjusted and normalized I symbol;
a first digital to analog converter operably coupled to convert the time domain frequency adjusted and normalized I symbol into a normalized I symbol with frequency adjustment; and
a first mixer operably coupled to mix the normalized I symbol with frequency adjustment with the in-phase local oscillation to produce the first up-conversion signal;

the second up-conversion module including:
a Q normalizing module operably coupled to normalize amplitude of the Q symbol to produce an amplitude normalized Q symbol;
a second frequency adjust module operably coupled to adjust frequency of the amplitude normalized Q symbol based on the frequency information to produce a frequency adjusted and normalized Q symbol;
a second inverse fast Fourier transform module operably coupled to convert the frequency adjusted and normalized Q symbol into a time domain frequency adjusted and normalized Q symbol;
a second digital to analog converter operably coupled to convert the time domain frequency adjusted and normalized Q symbol into a normalized Q symbol with frequency adjustment; and
a second mixer operably coupled to mix the normalized Q symbol with frequency adjustment with the quadrature local oscillation to produce the second up-conversion signal.

9. The hybrid transmitter of claim 5 further comprises:
a local oscillation module that includes:
an oscillator operably coupled to produce an oscillation;
a divider operably coupled to divide frequency of the oscillation to produce a reduced frequency oscillation;
a mixer operably coupled to mix the oscillation with the reduced frequency oscillation to produce a local oscillation; and
a frequency adjusting module operably coupled to adjust frequency of the local oscillation based on the frequency information to produce a frequency adjusted local oscillation, wherein a quadrature local oscillation with frequency adjustment and an in-phase local oscillation with frequency adjustment are derived from the frequency adjusted local oscillation;

the first up-conversion module including:
an I normalizing module operably coupled to normalize amplitude of the I symbol to produce an amplitude normalized I symbol;
a first inverse fast Fourier transform module operably coupled to convert the normalized I symbol into a time domain normalized I symbol;
a first digital to analog converter operably coupled to convert the time domain normalized I symbol into a normalized I symbol; and
a first mixer operably coupled to mix the normalized I symbol with the in-phase local oscillation with frequency adjustment to produce the first up-conversion signal; and the second up-conversion module including:
a Q normalizing module operably coupled to normalize amplitude of the Q symbol to produce an amplitude normalized Q symbol;
a second inverse fast Fourier transform module operably coupled to convert the normalized Q symbol into a time domain normalized Q symbol;
a second digital to analog converter operably coupled to convert the time domain normalized Q symbol into a normalized Q symbol; and
a second mixer operably coupled to mix the normalized Q symbol with the quadrature local oscillation with frequency adjustment to produce the second up-conversion signal.

10. A hybrid transmitter comprises:
a baseband processing module operably coupled to:
convert input data into an in-phase (I) symbol and a quadrature (Q) symbol;
generate phase information based on the I and Q symbols;
generate a magnitude-normalized I symbol and a magnitude-normalized Q symbols; and
generate amplitude information based on the I and Q symbols;
a phase modulation module operably coupled to:
generate a phase modulated I signal from the magnitude-normalized I symbol based on the phase information; and
generate a phase modulated Q signal from the magnitude-normalized Q symbol based on the phase information;
up-conversion module operably coupled to convert the phase modulated I signal and the phase modulated Q signal into a radio frequency (RF) signal based on a local oscillation; and
power amplifier circuit operably coupled to amplitude modulate the RF signal based on the amplitude information to produce an amplitude modulated RF signal;
wherein the phase modulation module includes:
an I normalizing module operably coupled to normalize amplitude of the I symbol to produce the amplitude normalized I symbol;
a first phase adjust module operably coupled to adjust phase of the amplitude normalized I symbol based on the phase information to produce a phase adjusted and normalized I symbol;
a first inverse fast Fourier transform module operably coupled to convert the phase adjusted and normalized I symbol into a time domain phase adjusted and normalized I symbol;
a first digital to analog converter operably coupled to convert the time domain phase adjusted and normalized I symbol into the phase modulated I signal; and
a Q normalizing module operably coupled to normalize amplitude of the Q symbol to produce the amplitude normalized Q symbol;
a second phase adjust module operably coupled to adjust phase of the amplitude normalized Q symbol based on the phase information to produce a phase adjusted and normalized Q symbol;
a second inverse fast Fourier transform module operably coupled to convert the phase adjusted and normalized Q symbol into a time domain phase adjusted and normalized Q symbol; and
a second digital to analog converter operably coupled to convert the time domain phase adjusted and normalized Q symbol into the phase modulated Q signal.

11. The hybrid transmitter of claim 10, wherein the baseband processing module comprises:
an encoding module operably coupled to encode a stream of data to produce a plurality of I symbol components and a plurality of Q symbol components, wherein the input data includes the stream of data;

a puncture module operably coupled to puncture the plurality of I symbol components and the plurality of Q symbol components to produce a plurality of punctured I symbol components and a plurality of punctured Q symbol components;

an interleaving module operably coupled to interleave the punctured I symbol components to produce a plurality of interleaved I symbols and to interleave the punctured Q symbol components to produce a plurality of interleaved Q symbols, wherein the plurality of interleaved I symbols includes the I symbol and the plurality of interleaved Q symbols includes the Q symbol;

a phase determination module operably coupled to determine the phase information based on an inverse tangent of the Q symbol and the I symbol; and an amplitude determination module operably coupled to determine the amplitude information based on a square root of a sum of magnitude of the I symbol squared and magnitude of the Q symbol squared.

* * * * *